(12) United States Patent
Mori et al.

(10) Patent No.: US 6,520,409 B1
(45) Date of Patent: Feb. 18, 2003

(54) ELECTRONIC TRANSACTION METHOD AND SYSTEM

(75) Inventors: Masakatsu Mori, Yokohama (JP); Nariyasu Hamada, Inagi (JP); Makoto Kayashima, Yamato (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/561,966

(22) Filed: May 1, 2000

Related U.S. Application Data

(63) Continuation of application No. 09/225,003, filed on Jan. 4, 1999, now Pat. No. 6,073,839, which is a continuation of application No. 08/788,446, filed on Jan. 29, 1997, now Pat. No. 5,880,446.

(30) Foreign Application Priority Data

Jan. 31, 1996 (JP) ............................................ 08-015519

(51) Int. Cl.[7] .............................................. G06K 05/00
(52) U.S. Cl. ......................................... 235/380; 705/37
(58) Field of Search ................................. 235/380, 379, 235/382, 375, 462.1, 382.5, 492, 494; 902/28–30; 705/1, 35, 9, 36, 10, 39, 14, 27, 26, 40, 23, 37

(56) References Cited

U.S. PATENT DOCUMENTS

| | | | |
|---|---|---|---|
| 4,314,352 A | 2/1982 | Fought | 364/900 |
| 5,001,744 A | 3/1991 | Nishino et al. | 379/93 |
| 5,280,498 A | 1/1994 | Tymes et al. | 235/462 |
| 5,490,217 A | 2/1996 | Wang et al. | 235/462 |
| 5,640,193 A | 6/1997 | Wellner | 348/7 |
| 5,794,207 A * | 8/1998 | Walker et al. | 705/1 |
| 5,826,241 A | 10/1998 | Stein et al. | 705/26 |
| 5,845,265 A * | 12/1998 | Woolston | 705/27 |
| 5,870,771 A | 2/1999 | Oberg | 707/502 |
| 5,880,446 A | 3/1999 | Mori et al. | 235/380 |
| 6,108,639 A * | 8/2000 | Walker et al. | 705/26 |
| 6,226,618 B1 * | 5/2001 | Downs et al. | 705/1 |
| 6,253,027 B1 * | 6/2001 | Weber et al. | 386/287 |
| 6,336,098 B1 * | 1/2002 | Fortenberry et al. | 705/14 |
| 6,336,100 B1 * | 1/2002 | Yamada | 705/26 |

\* cited by examiner

*Primary Examiner*—Thien M. Le
(74) *Attorney, Agent, or Firm*—Antonelli, Terry, Stout & Kraus, LLP

(57) ABSTRACT

A server system has stored therein a plurality of electronic transaction procedures corresponding to elements or combinations thereof including means of payment settlement of a purchased commodity, amount of deal, contents of the purchased commodity, financial institutions for making the settlement and so on. The server system selects one of the electronic transaction procedures corresponding to elements or a combination thereof, including means of payment settlement of a commodity to be purchased when a purchase-side client system requests a seller to sell the commodity. The electronic transaction procedure is distributed to the offer-side client, the purchase-side client and the settlement-side client through a communication network. Each of the offer-side client, the purchase-side client and the settlement-side client executes electronic transaction processes according to the distributed electronic transaction procedure. Either all of the selected electronic transaction procedure is distributed from the server system to the client systems at a time or parts of the electronic transaction procedure are successively distributed to the client systems from the server system.

12 Claims, 27 Drawing Sheets

| PARTICIPANT NAME | DUTY PROCEDURE NAME | ADDRESS | REMARKS |
|---|---|---|---|
| USE 1 | DUTY 1 | ADDRESS 1 | BUYER |
| OFFER 1 | DUTY 2 | ADDRESS 2 | SELLER |
| SETTLEMENT 1 | DUTY 3 | ADDRESS 3 | FINANCIAL INSTITUTION |

FIG.12

| ORDER | PARTICIPANT NAME | PROCESS NAME |
|---|---|---|
| | | ELECTRONIC TRANSACTION PROCEDURE ID : 1234567 |
| 1 | USE 1 | DUTY 1-PROCESS 1<br>INPUT ORDER |
| 2 | OFFER 1 | DUTY 2-PROCESS 1<br>ACCEPT ORDER/REQUEST AUTHORIZATION |
| 3 | SETTLEMENT 1 | DUTY 3-PROCESS 1<br>AUTHORIZE |
| 4 | OFFER 1 | DUTY 2-PROCESS 2<br>CONFIRM AUTHORIZATION/TRANSMIT ORDER RESULT |
| 5 | USE 1 | DUTY 1-PROCESS 2<br>CONFIRM ORDER |
| 6 | OFFER 1 | DUTY 2-PROCESS 3<br>REQUEST SETTLEMENT |
| 7 | SETTLEMENT 1 | DUTY 3-PROCESS 2<br>SETTLE |
| 8 | OFFER 1 | DUTY 2-PROCESS 4<br>CONFIRM SETTLEMENT/TRANSMIT DEAL RESULT |
| 9 | USE 1 | DUTY 1-PROCESS 3<br>CONFIRM DEAL |

FIG.13

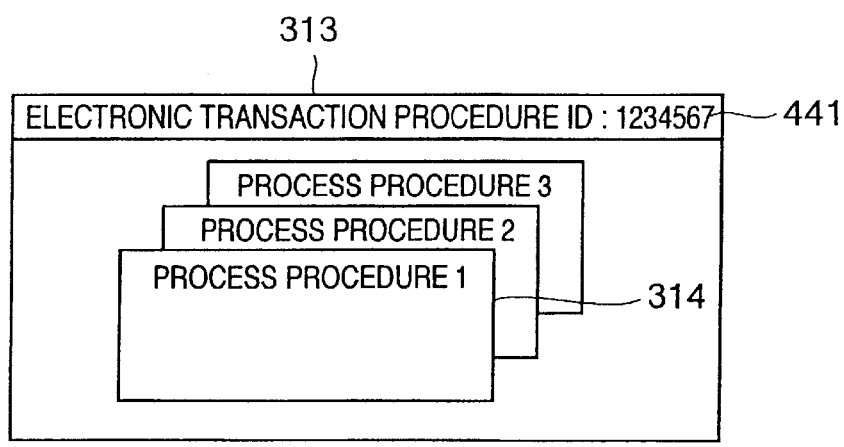

FIG.14

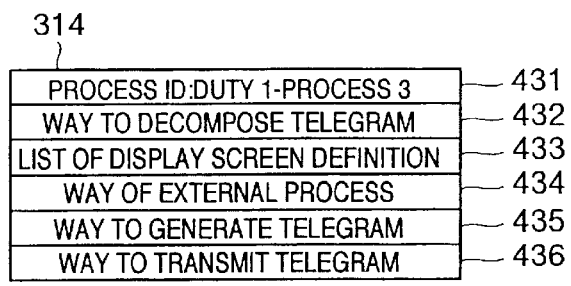

314
- PROCESS ID:DUTY 1-PROCESS 3 — 431
- WAY TO DECOMPOSE TELEGRAM — 432
- LIST OF DISPLAY SCREEN DEFINITION — 433
- WAY OF EXTERNAL PROCESS — 434
- WAY TO GENERATE TELEGRAM — 435
- WAY TO TRANSMIT TELEGRAM — 436

FIG.15

| ELECTRONIC TRANSACTION ID : 19960101 | | | ELECTRONIC TRANSACTION PROCEDURE ID : 1234567 | |
|---|---|---|---|---|
| ORDER | PARTICIPANT NAME | PROCESS NAME | ARRIVAL TIME | PROCESS COMPLETION TIME |
| 1 | USE 1 | DUTY 1-PROCESS 1 INPUT ORDER | | |
| 2 | OFFER 1 | DUTY 2-PROCESS 1 ACCEPT ORDER/REQUEST AUTHORIZATION | | |
| 3 | SETTLEMENT 1 | DUTY 3-PROCESS 1 AUTHORIZE | | |
| 4 | OFFER 1 | DUTY 2-PROCESS 2 CONFIRM AUTHORIZATION/ TRANSMIT ORDER RESULT | | |
| 5 | USE 1 | DUTY 1-PROCESS 2 CONFIRM ORDER | | |
| 6 | OFFER 1 | DUTY 2-PROCESS 3 REQUEST SETTLEMENT | | |
| 7 | SETTLEMENT 1 | DUTY 3-PROCESS 2 SETTLE | | |
| 8 | OFFER 1 | DUTY 2-PROCESS 4 CONFIRM SETTLEMENT/ TRANSMIT DEAL RESULT | | |
| 9 | USE 1 | DUTY 1-PROCESS 3 CONFIRM DEAL | | |

| NUMBER | ELECTRONIC TRANSACTION ID | STATUS |
|--------|---------------------------|--------|
| 1 | 1234 | END |
| 2 | 3467 | END |
| 3 | 6780 | UNDER PROCESS |
| 4 | 13579 | END |
| 5 | 23456 | UNDER PROCESS |

| SETTLEMENT MEANS | FINANCIAL INSTITUTION NAME | ELECTRONIC TRANSACTION PROCEDURE ID |
|------------------|----------------------------|-------------------------------------|
| SETTLE CREDIT | CREDIT A | 1234567 |
| SETTLE CREDIT | CREDIT B | 1234568 |
| SETTLE CREDIT | CREDIT C | 1234569 |
| PAID TO BANK | BANK D | 1234601 |
| PAID TO BANK | BANK E | 1234602 |
| PAID TO BANK | BANK F | 1234603 |

711 712 71 713

ELECTRONIC TRANSACTION METHOD AND SYSTEM

This is a continuation of application Ser. No. 09/225,003, filed Jan. 4, 1999 now U.S. Pat. No. 6,073,839; which is a continuation of Ser. No. 08/788,446, filed Jan. 29, 1997, now U.S. Pat. No. 5,880,446.

BACKGROUND OF THE INVENTION

The present invention relates to an electronic transaction method and system for electronically making a commercial transaction through a communication network, and particularly to an electronic transaction method and system capable of flexible electronic transaction by changing an electronic transaction process at each seller or financial institution or each element concerned with settlement such as merchandise to sell and an amount of money or at each combination thereof.

A remarkable electronic transaction system through a network is an electronic transaction system utilizing the Internet. This electronic transaction system, unlike the ones using the personal computer communications and CATV, has the advantage of being able to be used by everyone if connected to the Internet. In order to have electronic dealings through the Internet, it is necessary to provide a secure communications procedure capable of maintaining the secret of data in communication and a certifying procedure for confirming a person or company with which one has dealings.

Various different electronic transaction procedures have been developed for these necessaries. There are STT (secure transaction technology; executed by Microsoft and VISA), SEPP (secure electronic payment protocol; used by MasterCard, IBM, Netscape, CyberCash, and GTE Corp) and SET which are used for settlement of credits. These satisfy the above requirements by defining different data items in communication, coding/decoding systems, digital signature/certification procedure, and data checking method. Thus, the user can make secure electronic transaction on the Internet by executing applications software having these procedures utilized.

In addition, these electronic transaction procedures are being tried to be unified. One of the combined versions is Universal Payment Protocol (CyberCash). In this combined version, data contents are expressed in MIME form, and communication data items are automatically sent on an application of the described procedure. The Universal Payment Protocol is written in, for example, INTERNET-DRAFT, "Universal Payment Preamble", Nov. 6, 1995, pp. 2–15.

However, in order to use an application having STT, SEPP or SET incorporated, it is necessary to previously install it in the terminals for an electronic transaction. Thus, both seller and buyer must have the same application in order to make electronic transaction.

Also, since this application is now used only for the settlement of credits, transfer of money to a bank and settlement of electronic money will be required to use an application that has another electronic transaction procedure incorporated. In other words, the electronic transaction user needs various kinds of application soft for the respective electronic transaction procedures, which increase the capacity of the memory in the user's terminal.

Moreover, when there is a need to change the electronic transaction procedure, coding/decoding system, digital signature/certification procedure or data checking method in order to improve the service to the users, a new application after the change must be again distributed to the users. Therefore, it is not possible to flexibly and swiftly overcome the difficulties in the change of electronic transaction procedures.

Meanwhile, the Universal Payment Protocol can unify data communications, but still needs various different applications because received data are treated by each application for electronic transaction. This results in the increase of the capacity of the memory in the terminal of the electronic transaction user as described above.

SUMMARY OF THE INVENTION

Accordingly, it is an object of the invention to provide an electronic transaction method and system capable of solving the problems with the prior art to thereby decrease the number of applications necessary for an electronic deal, and to flexibly and swiftly cope with the alteration of the electronic transaction procedure without limitation to participants.

According to the present invention, there is provided an electronic transaction method for making an electronic deal by basically using an offer-side client system to be used by a seller of a commodity, a purchase-side client system to be used by a buyer of the commodity, a settlement-side client system for settlement of the purchase of the commodity, and a server system for supporting electronic transaction processes of the commodity which are connected through a communication network, and by executing electronic transaction processes for the settlement of the commodity to be purchased, according to a certain electronic transaction procedure among the purchase-side client system, the offer-side client system and the settlement-side client system when the purchase-side client requests the offer-side client to sell the commodity, the method including the steps of storing in the server system a plurality of electronic transaction procedures corresponding to elements or combinations of elements including means of payment settlement of the commodity, amount of deal, contents of the commodity and financial institutions participating in the payment settlement, selecting one of the electronic transaction procedures corresponding to a combination of elements including the means of payment settlement of the commodity in the server system when the purchase-side client requests the offer-side client to sell the commodity, and distributing the electronic transaction procedure through the communication network to the offer-side client system, the purchase-side client system and the settlement-side client system, and executing the electronic transaction processes according to the distributed electronic transaction procedure in the offer-side client system, the purchase-side client system and the settlement-side client system to thereby achieve the settlement of the purchased commodity, or the electronic deal.

Moreover, according to the invention, there is provided an electronic transaction system having: a server system which includes storage means having stored therein a plurality of electronic transaction procedures corresponding to elements or combinations of elements including means of payment settlement of the commodity, amount of deal, contents of the commodity and financial institutions participating in the payment settlement, procedure selecting means for selecting one electronic transaction procedure corresponding to the elements including the means of payment settlement of the commodity in accordance with the purchase request from the purchase-side client system, and transmitting means for transmitting the selected electronic transaction procedure through the communication network to the offer-side client system, the purchase-side client system and the settlement-side client system; and an offer-side client system, purchase-side client system and settlement-side client system each of which includes processing means for executing electronic transaction processes according to the electronic transaction procedure distributed from the server system.

In this case, the electronic transaction procedure is distributed by the following ways:

(1) It is distributed to each client system at a time
(2) It is transferred together with a message of commodity information and so on to a participant client system in the order of participants in an electronic deal.
(3) A current participant client system requests the server system to send a part of the electronic transaction procedure necessary at the next stage, and the part of the electronic transaction procedure distributed from the server in accordance with this request is transferred together with a message to the next participant.
(4) A current participant client system requests the server system to send a part of the electronic transaction procedure necessary at the present stage, and the sever distributes it to the client system in response to this request.

Here, the commodity to be treated in the electronic deal is not limited to concrete objects, but may include intangible assets such as pay guide information and pay legal advice.

BRIEF DESCRIPTION OF THE DRAWINGS

FIG. 12 shows the structure of an order table used in the first embodiment of the invention.

FIG. 13 shows the structure of a duty procedure used in the first embodiment of the invention.

FIG. 14 shows the structure of a procedure used in the first embodiment of the invention.

FIG. 15 shows the structure of a progression table used in the first embodiment of the invention.

FIG. 16 shows the structure of an electronic transaction management table used in the first embodiment of the invention.

FIG. 17 shows the structure of an electronic transaction procedure selection table used in the first embodiment of the invention.

DESCRIPTION OF THE PREFERRED EMBODIMENTS

Some embodiments of the invention will be described in detail with reference to the accompanying drawings.

Figure 1:
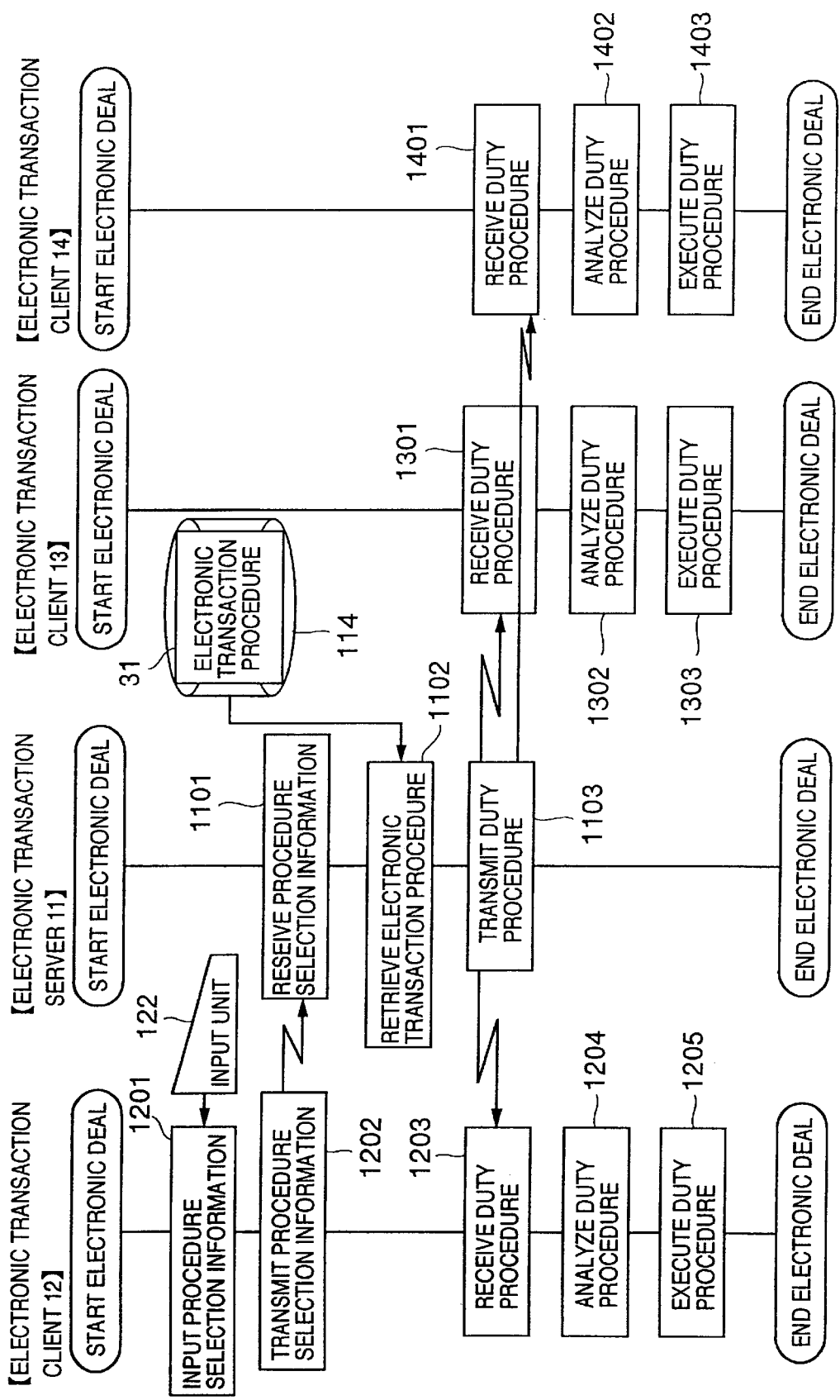
FIG. 1 is a flow chart of the initial processing of the invention.
Figure 2:
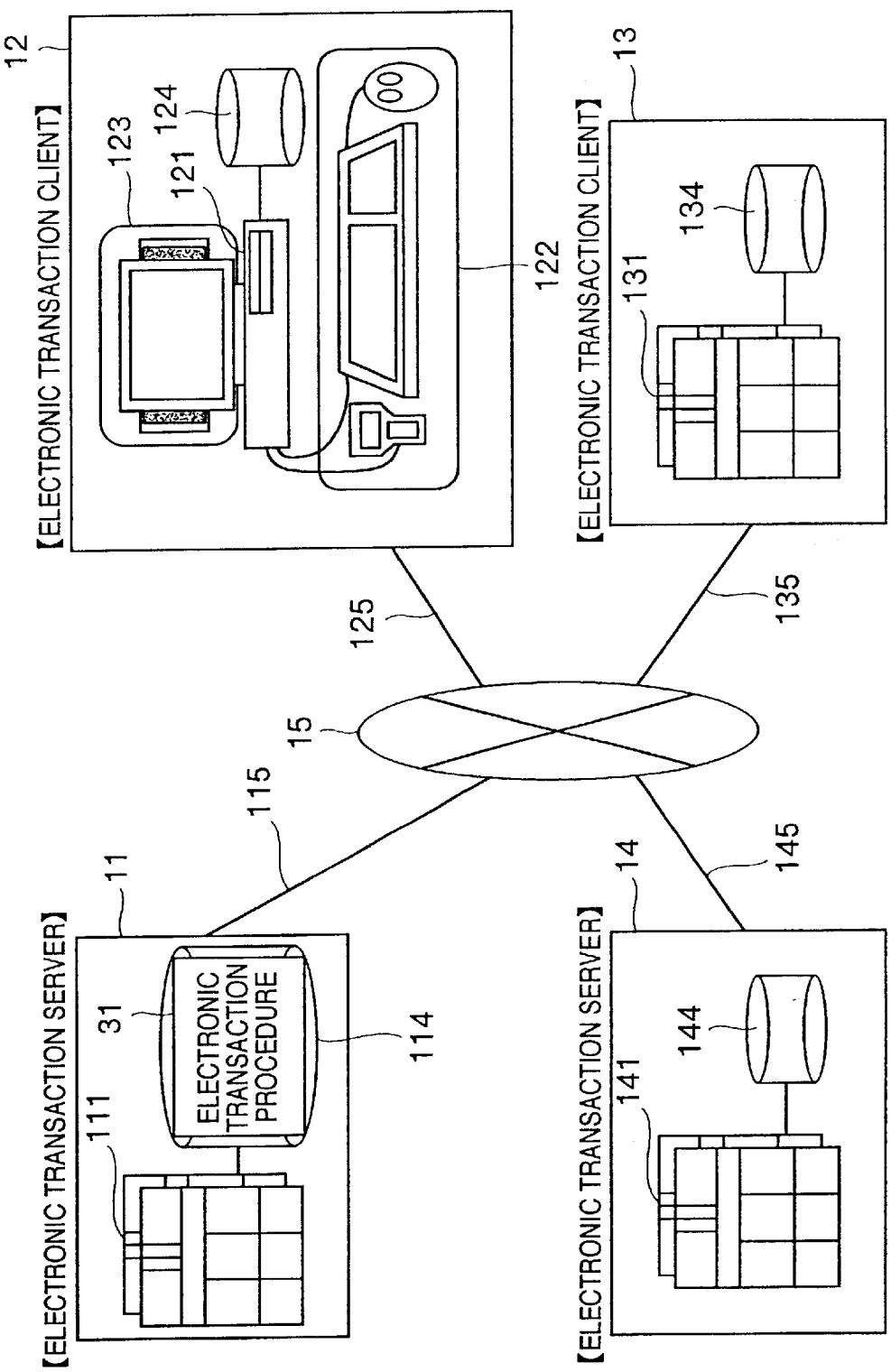
FIG. 2 shows the whole arrangement of an electronic transaction system including devices for executing the first embodiment of the invention.
Figure 3:
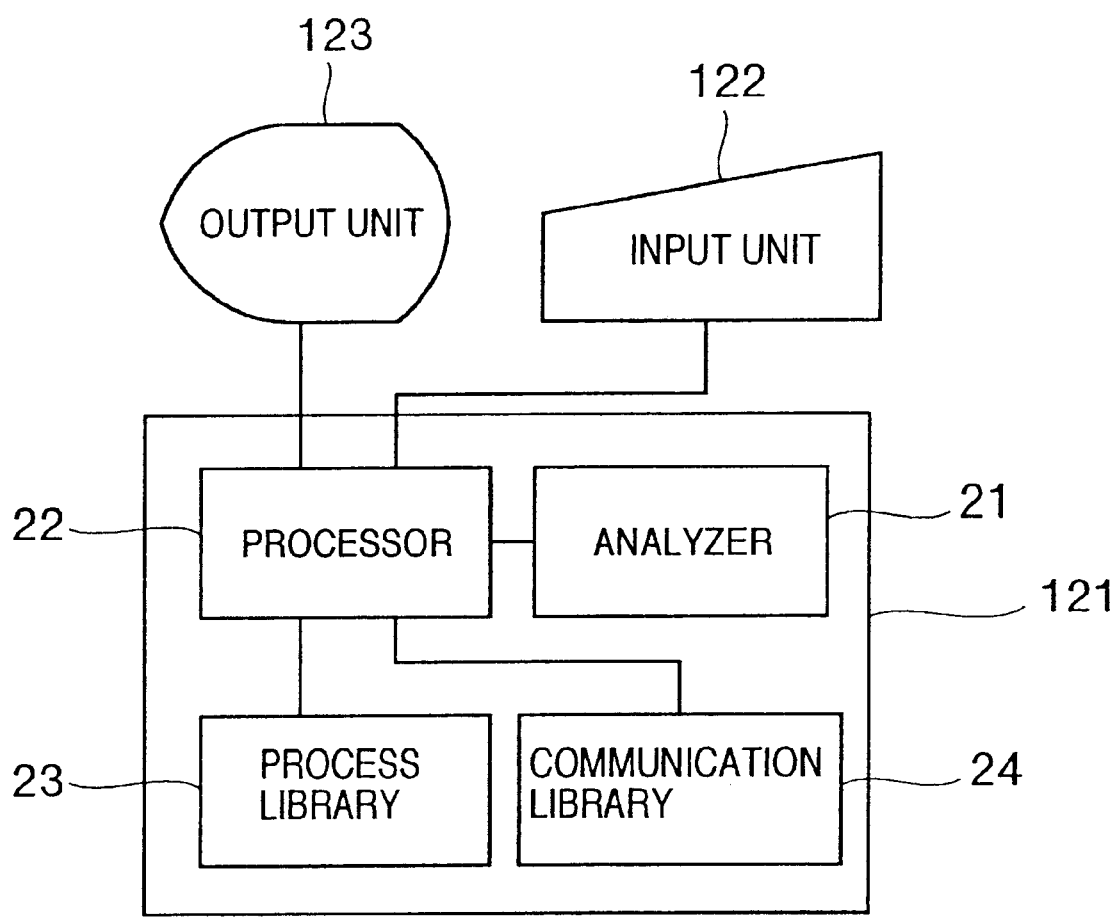
FIG. 3 is a block diagram of the modules of an electronic transaction client constituting the electronic transaction system in the invention.

FIG. 1 is a flow chart of the initial processing of the invention. FIG. 2 shows the whole arrangement of the electronic transaction system including devices for embodying the invention. FIG. 3 is a block diagram of the arrangement of a typical client device in this embodiment.

The electronic transaction system will be first described with reference to FIG. 2.

The electronic transaction system of this embodiment has an electronic transaction server 11 for managing an electronic transaction procedure, electronic transaction clients 12, 13 and 14 as participants who make electronic transaction, and a communication network 15 which connects the server and the clients together.

In this example, there are three participants for electronic transaction, of which the electronic transaction client 12 is a system for receiving electronic transaction services (for example, a buyer), and of which the electronic transaction clients 13 and 14 are systems for providing electronic transaction services (for example, sellers, financial institutions).

While the electronic transaction server 11 is independently provided here, any one of the electronic transaction clients 12, 13 and 14 may function as both the server and itself.

(1) The Arrangement of Electronic Transaction Server 11

The electronic transaction server 11 has a computer 111 and a storage device 114 and is connected to the outside through a communication cable 115.

The storage device 114 is not limited to a magnetic disk, but may be an optical disk, a magnetooptical disk or a semiconductor memory. The most important thing is that the storage device has enough capacity to store programs to be executed and a large amount of data files.

In the storage device 114 of the electronic transaction server 11 is previously stored an electronic transaction procedure that includes the names of participants in electronic transaction and a written procedure for duties to be treated among the participants.

It is desirable that the communication cable 115 be able to fast transmit a large amount of data like an optical cable.

In this case, when data are received or transmitted on a radio communication channel between the server 11 and the communication network 15, the communication cable 115 is replaced by a radio communication channel interface.

The arrangement of the system for embodying the invention may be one generally called computer system. The electronic transaction server 11 simultaneously supplies an electronic transaction procedure from its storage device 114 to a large number of other systems, and thus it should be desirably a high-speed large-capacity computer system. Specifically, it should be a large computer or high-performance workstation of course, even a special system produced exclusively for the invention should have the functions of the peripheral apparatus given above.

(2) The Arrangement of Electronic Transaction Client 12

The electronic transaction client 12 has a computer 121, an input unit 122, an output unit 123 and a storage device 124 and is connected to a communication cable 125.

The input unit 122 is constituted by a keyboard and a pointing device (e.g., mouse, and pen), and if necessary, by a label reader (e.g., bar-code reader and handy scanner) in order to easily input from a catalog sheet.

The output unit 123 is desirably constructed by a high-definition display and a loud speaker in order to correctly and precisely describe goods.

The storage device 124 is not limited to a magnetic disk, but may be an optical disk, a magnetooptical disk or a semiconductor memory. The essential thing is that the storage device has enough capacity to store programs to be executed, and a large amount of data files.

The communication cable 125 should be able to fast transmit a large quantity of data like an optical cable. In this case, when data is received and transmitted on a radio communication channel between the client and the communication network 15, the communication cable 125 is replaced by a radio communication channel interface.

The arrangement of the system for embodying the invention may be one generally called computer system. Specifically, it may be a personal computer or the like which the general user can own with ease. Of course, even a special system produced exclusively for the invention should have the functions of the peripheral apparatus given above.

(3) The Arrangement of Electronic Transaction Client 13

The electronic transaction client 13 has a computer 131 and a storage device 134, and is connected to a communication cable 135. The storage device 134 is not limited to a magnetic disk, but may be an optical disk, a magnetooptical disk or a semiconductor memory. The main thing is that the storage device has enough capacity to store programs to be executed, and a large amount of data files.

The communication cable 135 should be able to fast transmit a large amount of data like an optical cable. In this case, when data are received and transmitted on a radio communication channel between the client 13 and the communication network 15, the communication cable 135 is replaced by a radio communication channel interface.

The arrangement of the system for embodying the invention may be one generally called computer system. The electronic transaction client 13 simultaneously serves a large number of other systems, and thus it should be a high-speed large-capacity computer system. Specifically, it should be a large computer or high-performance workstation. Of course, even a special system produced exclusively for the invention should have the functions of the peripheral apparatus given above.

(4) The Arrangement of Electronic Transaction Client 14

The electronic transaction client 14 is similar to the client 13, or has a computer 141 and a storage device 144, and is connected to a communication cable 145. The storage device 144 is not limited to a magnetic disk, but may be an optical disk, a magnetooptical disk or a semiconductor memory. The main thing is that the storage device has enough capacity to store programs to be executed, and a large amount of data files.

The communication cable 145 should be able to fast transmit a large amount of data like an optical cable. In this case, when data are received and transmitted on a radio communication channel between the client 14 and the communication network 15, the communication cable 145 is replaced by a radio communication channel interface.

(5) The Arrangement of Communication Network 15

The communication network 15 is constructed by a high-speed communication network such as B-ISDN.

The modules of client 12 will be described with reference to FIG. 3.

FIG. 3 is a block diagram of the electronic transaction client 12. The other clients 13 and 14 have the same construction.

The computer 121 is constituted by an analyzer 21, a processor 22, a process library 23 and a communication library 24.

The analyzer 21 analyzes an electronic transaction procedure for electronic transaction among a seller, a buyer and a financial institution.

The processor 22 processes the electronic transaction procedure analyzed by the analyzer 21, by using the process library 23 and communication library 24.

The process library 23 is used by the processor 22, and includes code/decode library and GUI library for output display.

The communication library 24 is used by the processor 22 to communicate with other systems (electronic transaction server 11 and electronic transaction clients 13, 14).

The processing operations of this embodiment according to the flow chart of FIG. 1 will be described with reference to FIGS. 2 and 3. Here, it is assumed that the offer/retrieval/decision of information concerned with goods to be treated in an electronic transaction is already finished. Also, the electronic transaction clients 12, 13 and 14 are assumed to be the systems used by a buyer, a seller and a financial institution, respectively. Moreover, an electronic transaction is assumed to be started by the buyer, or electronic transaction client 12.

Step 1201

Information necessary for selecting an electronic transaction procedure is inputted by the input unit 122 of the electronic transaction client 12.

The information necessary for selecting an electronic transaction procedure is the information of elements associated with settlement or a combination thereof, such as information concerned with the way to settle an account of transfer of money to a bank or credits, information of amount of deal in this electronic deal, information concerned with the contents and property of merchandise, and information relating to financial institutions.

The property of a commodity indicates the information of whether the commodity can be distributed through the network or whether it is required to be transported by mail.

Step 1202

The information inputted for selecting an electronic transaction procedure at step 1201 is transmitted from the electronic transaction client 12 through the communication network 15 to the electronic transaction sever 11.

Step 1101

The electronic transaction server 11 receives the electronic transaction procedure selection information from the electronic transaction client 12 through the communication network 15.

Step 1102

The electronic transaction server 11 retrieves the electronic transaction procedure from the storage device 114 on the basis of the received electronic transaction procedure selection information.

Step 1103

The electronic transaction server 11 transmits a duty procedure to be processed, to the participants (here, electronic transaction clients 12, 13 and 14) of which the names are included in the retrieved electronic transaction procedure, through the communication network 15.

Steps 1203, 1301, 1401

The electronic transaction clients 12, 13 and 14 receive the duty procedure from the electronic transaction server 11 through the communication network 15.

Steps 1204, 1302, 1402

The electronic transaction clients 12, 13 and 14 cause their analyzers 21 to analyze the received duty procedure.

Steps 1205, 1303, 1403

The electronic transaction clients 12, 13 and 14 force their processors 22 to execute the duty procedure analyzed by the analyzers 21 by use of the process library 23 and communication library 24.

If the means of settlement selected by the buyer is "transfer of money to a bank", the electronic transaction procedure corresponding to the "transfer of money to a bank" is distributed from the electronic transaction server 11 to each client 12, 13, 14. Thus, the electronic transaction is performed according to the distributed electronic transaction procedure.

Similarly, if the amount of money at this transaction corresponds to "large-amount-of-money transaction exceeding a standard amount of money established by financial institutions", an electronic transaction procedure including a special certification procedure for expecting the safety of the transaction is distributed from the electronic transaction server 11 to each client 12, 13, 14, which then executes the electronic transaction according to the distributed electronic transaction procedure.

Similarly, if the commodity to be offered by the seller has the property capable of being distributed through the communication network, the transaction procedure according to this property is distributed from the server 11 to each client 12, 13, 14, which then executes the electronic transaction according to the distributed electronic transaction procedure.

The electronic transaction procedure distributed to each client 12, 13, 14 is erased at the end of the transaction in order that the procedure itself is not open to the other people. Although the electronic transaction procedure is erased at each client, various kinds of table such as progression table may be left stored for the purpose of error recovery or the like.

As described above, before the start of the electronic transaction, the information of means for settlement, amount of money in transaction, and contents and property of goods are inputted by the buyer, or electronic transaction client 12, and transmitted as the electronic transaction procedure selection information to the electronic transaction server 11. The electronic transaction server 11 retrieves the electronic transaction procedure corresponding to the electronic transaction procedure selection information from the storage device 114, and distributes it to the electronic transaction client 12 associated with this electronic transaction. Then, the electronic transaction is executed in accordance with the electronic transaction procedure received by each client 12, 13, 14. Therefore, the number of applications necessary for the electronic transaction can be decreased. In addition, the electronic transaction procedure can be flexibly and swiftly changed, and the electronic transaction can be performed without limitation to the customers.

In other words, each client 12, 13, 14 does not need to previously hold electronic transaction procedures corresponding to various kinds of means of settlement, and is able to flexibly make electronic transaction without limitation to the customers.

In addition, even if the electronic transaction procedure is required to change in order to improve the service to the buyer, the portion to be changed is only the electronic transaction procedure stored in the storage device 114 of the electronic transaction server 11, and thus this change can be made swiftly and simply.

Moreover, since each client 12, 13, 14 should have incorporated therein only the communication processing function to receive the electronic transaction procedure distributed from the electronic transaction server 11, it is possible to reduce the capacities of the storage devices 124, 134 and 144.

In this case, each client 12, 13, 14 may have a specific electronic transaction procedure previously incorporated.

The first embodiment of the invention will be described in detail with reference to related drawings. Here, a description will be made of an electronic transaction method including means for managing an electronic transaction.

Figure 4:
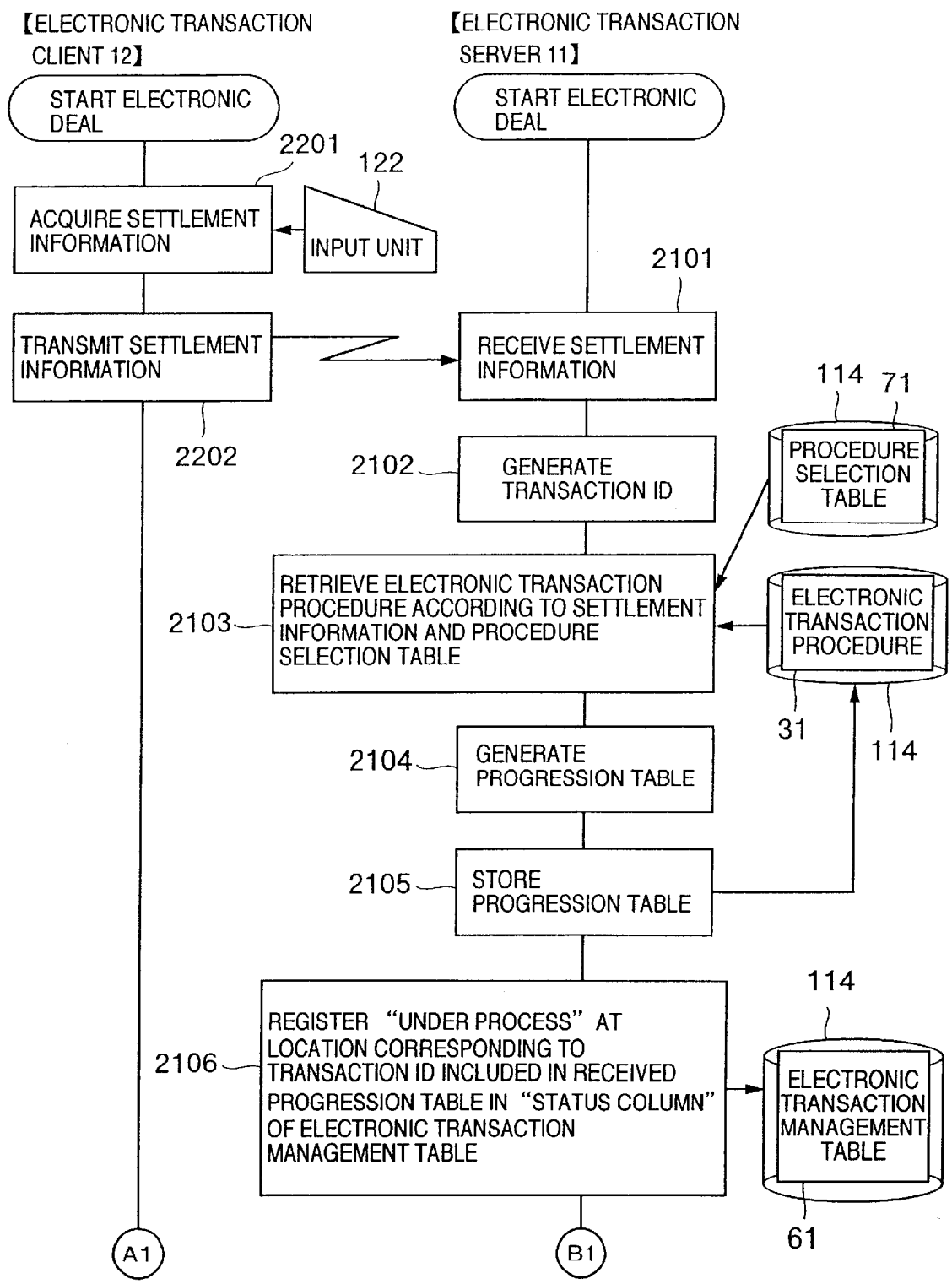
FIG. 4 is a flow chart for the electronic transaction client and server in the first embodiment of the invention.
Figure 5:
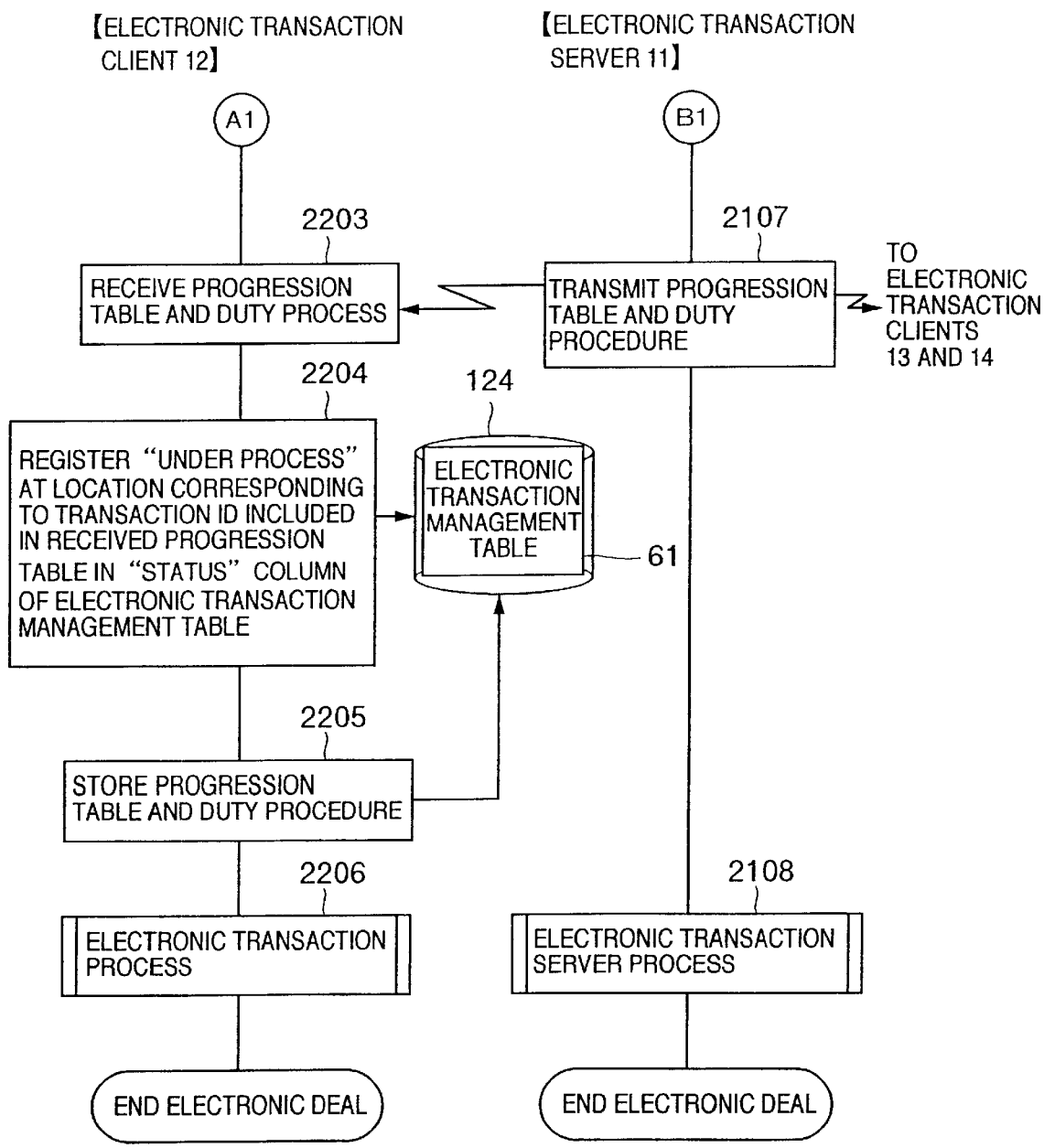
FIG. 5 is a flow chart continued from FIG. 4.
Figure 6:
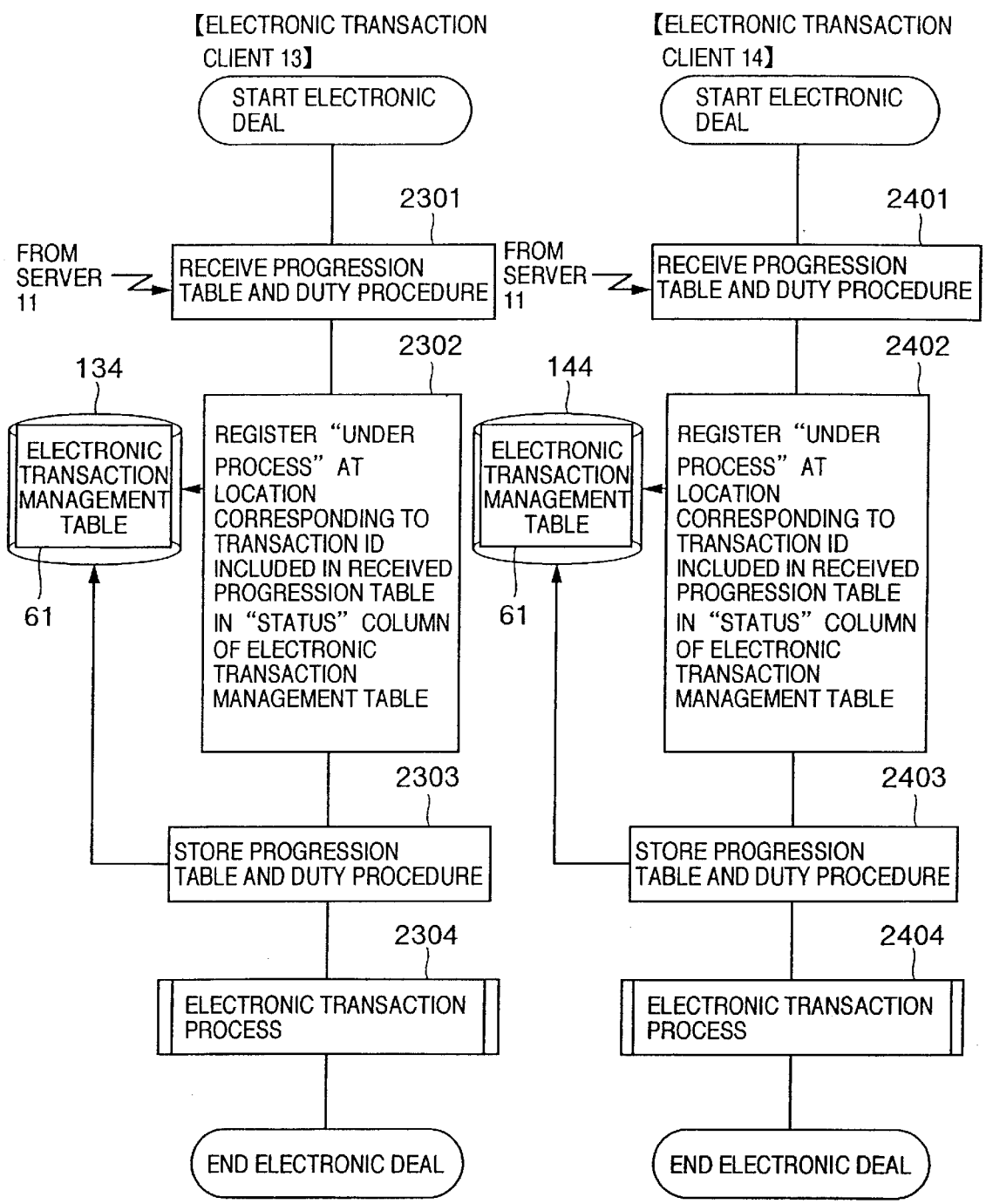
FIG. 6 is a flow chart associated with FIG. 4.
Figure 7:
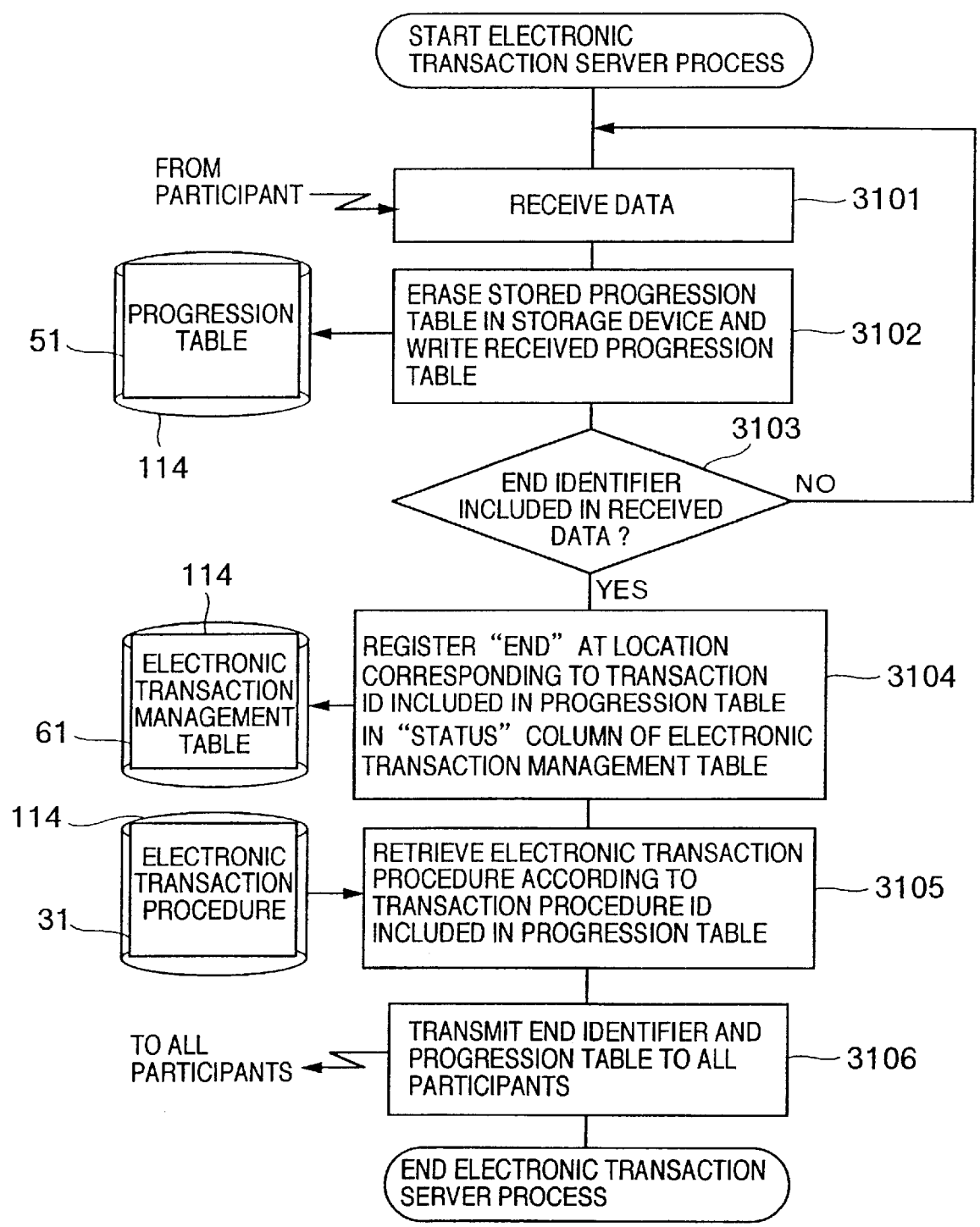
FIG. 7 is a flow chart for the details of the electronic transaction server in FIG. 4.
Figure 8:
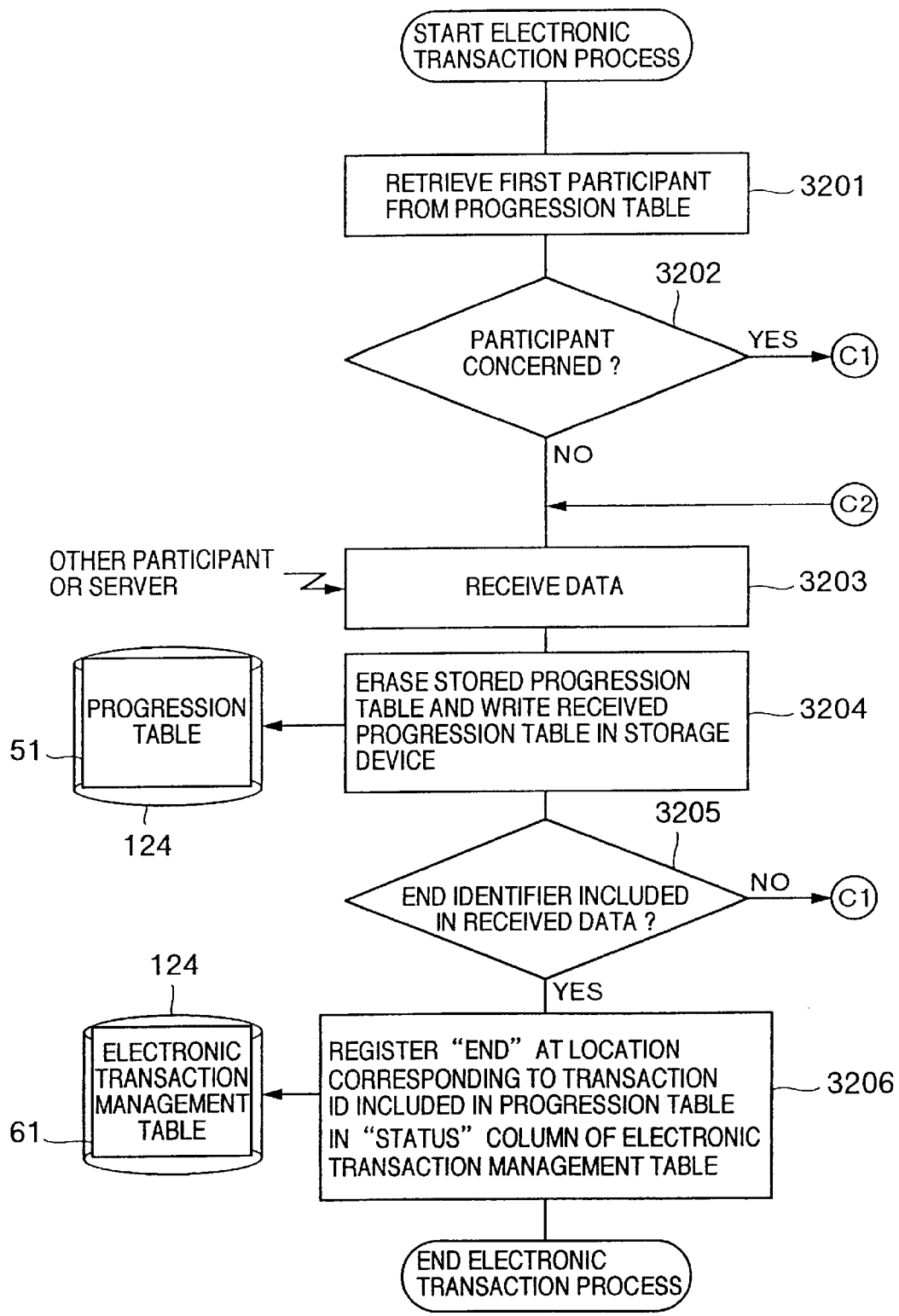
FIG. 8 is a flow chart for the details of the electronic transaction in FIG. 4.
Figure 9:
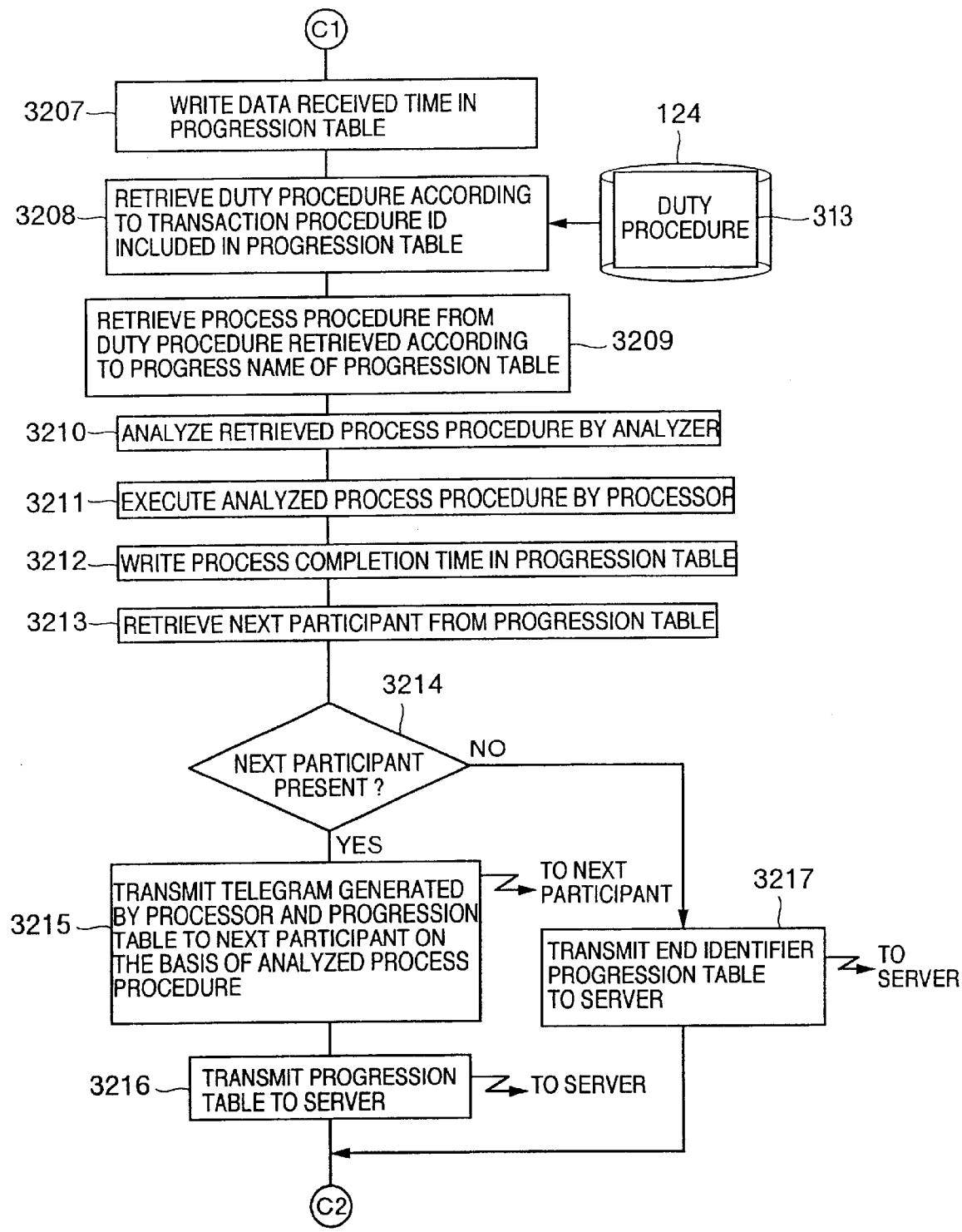
FIG. 9 is a flow chart continued from FIG. 8.

FIGS. 4 to 17 are flow charts of the first embodiment of the invention. Of these figures, FIGS. 4 and 5 are flow charts for the operations including the transmission and reception of data between the electronic transaction client 12 (buyer) and the electronic transaction server 11, FIG. 6 is a flow chart for the operations including the transmission and reception of data between the electronic transaction client 13 (seller) and the electronic transaction client 14 (financial institution), and FIG. 7 is a flow chart for the internal processing within the electronic transaction server 11. Also, FIGS. 8 and 9 are flow charts for the electronic transaction processing in the electronic transaction clients 12, 13, 14, FIGS. 10 to 14 are diagrams of the structures of the electronic transaction procedure, FIG. 15 is a diagram of the structure of a progression table for managing the progressive situations of the electronic transaction procedure, FIG. 16 is a diagram of the structure of an electronic transaction management table for managing the progressive situation at each electronic transaction, and FIG. 17 is a diagram of the structure of an electronic transaction procedure selection table for selecting one of a plurality of electronic transaction procedures.

It is assumed that the whole structure of the electronic transaction system including the apparatus, units or devices for realizing this embodiment is as in FIG. 2 and that each client 12, 13, 14 is constructed by such modules as shown in FIG. 3.

First, a description will be made of an electronic transaction procedure 31 previously stored in the storage device 114 of the electronic transaction server 11.

Figures 10, 11:
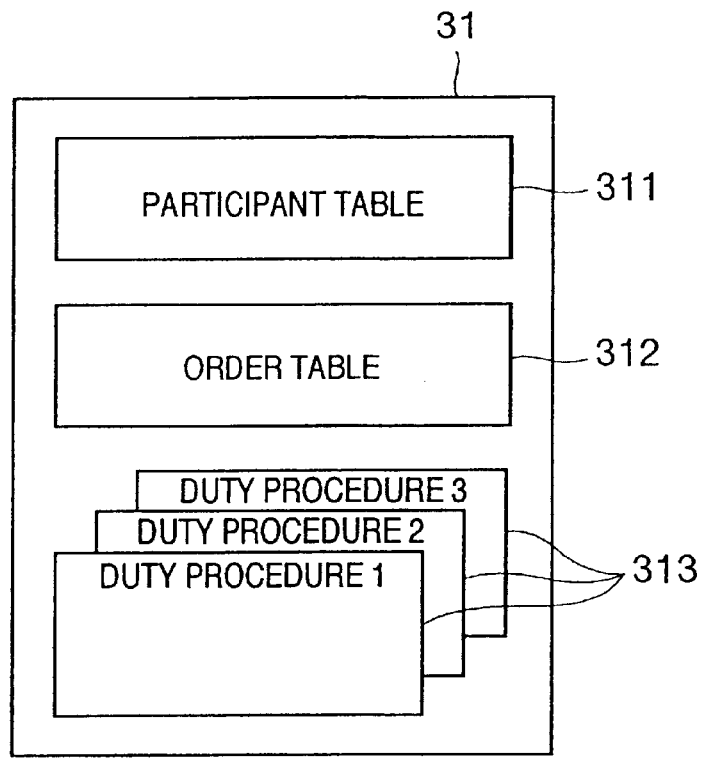
FIG. 10 shows the whole arrangement of the electronic transaction procedure used in the first embodiment of the invention.
FIG. 11 shows the structure of a participant table used in the first embodiment of the invention.

The electronic transaction procedure 31 is constructed by a participant table 311, an order table 312 and a plurality of duty procedures 313 as shown in FIG. 10.

The participant table 311 is used to define participants in an electronic transaction. As illustrated in FIG. 11, this table is constituted by a participants' names column 411, a duty procedures' names column 412 indicative of duty procedures to be used by participants, a participants' addresses column 413, and a remarks column 414.

The participants' names column 411 includes comprehensive names of participants making business operations such as buyer, seller and financial institution. For example, in the participant table 311 of FIG. 11, there are listed the name of a buyer, or "USE 1", the name of a seller, or "OFFER 1" and the name of a financial institution, or "SETTLEMENT 1". When a participant is determined, an address associated to the participant is written in the address field of the participant table 311.

The order table 312 is used to define the order in which the processes of an electronic transaction procedure are executed. As illustrated in FIG. 12, this table is constituted by an electronic transaction procedure ID 421 indicating an identifier for an electronic transaction procedure, an order column 422, a participants' names column 423, and a process names column 424.

The electronic transaction procedure ID 421 corresponds to the identification number of the procedure to be used for this electronic transaction. For example, for the settlement of a credit, is used the electronic transaction procedure of the electronic transaction procedure ID corresponding to a means of the settlement.

The duty procedure 313 is a collection of process procedures for each participant. As shown in FIG. 13, this duty procedure is constituted by an electronic transaction procedure ID 441, and a plurality of process procedures 314.

The process procedures 314 are used to define individual process procedures. As shown in FIG. 14, each process procedure 314 is constructed by a process ID 431, a message decomposing method 432, a display screen definition list 433, an external processing method 434, a message generating method 435 and a message transmitting method 436.

The message decomposing method 432 is used to define the message decomposing method and examination, such as a certification process (including a cipher library, the bit length of a cipher key, and the definition of a unidirectional function) for a message or a digital signature made on data items of different kinds, a decoding process (including a cipher library and the definition of the bit length of a cipher key) for a cipher given on a message or data, a process for decomposing a group of a plurality of kinds of data into each kind of data, and the examination on the kinds of data included in a message (the comparison between kinds of data of the same contents included in the same message and sent from other different sources, or the comparison between data already stored and a kind of data included in a message).

The display screen definition list 433 includes display forms defined on the output unit 123 such as letters, figures, images, tables, a text input box, command buttons, option buttons, radio buttons, list buttons, a list box and a combo box, which are used for input data.

The external processing method 434 includes processing methods defined for external apparatus and external modules, such as an inventory confirmation process to a stock management system, a commodity-sending-out order process or order cancel process to a commodity-sending-out order system, an authorization process to an authorization system, a process to a basic system such as a settlement process to a settlement system, and a transaction information delivery process to a household account book soft for managing a household account.

The message generating method 435 includes message generating methods defined to be transmitted to the server and other clients, such as a cipher process to a message or data of different kinds (including the definitions of a cipher library, the bit length of a cipher key and the like), a digital signature process to a message or data of different kinds (including the definitions of a cipher library used, the bit length of a cipher key and a unidirectional function), an irreversible process by a unidirectional function to data, and a process for compounding a plurality of kinds of data into a single group of data.

The message transmitting method 436 is the definitions of the methods of generating a message to be transmitted to the server and other clients, such as on-line communication, mail communication using SMTP (simple mail transfer protocol), data communication by HTTP (hyper text transfer protocol), and presence or absence of all-cipher message communication (including the definitions of a cipher library used, the bit-length of a cipher key and so on).

The progression table 51 is used to manage the progressive situations of an electronic transaction under process. As shown in FIG. 15, this table is constituted by an electronic transaction ID 511 for identifying an electronic transaction, an electronic transaction procedure ID 512, an order.column 513, a participants' names column 514, a process names column 515, and controlled situations. Here, the controlled situations include a message arrival time column 516 and a process completion time column 517.

The number of the electronic transaction procedure ID 512 is the same as that of the electronic transaction procedure ID 421 in FIG. 12 and as that of the electronic transaction procedure ID 441 in FIG. 13.

The electronic transaction ID 511 corresponds to the slip number in general transaction, and is generated by the electronic transaction server 11 each time a buyer generates a demand for an electronic deal.

The electronic transaction management table 61 is used to manage the electronic transactions already finished at the present time or those under execution. As shown in FIG. 16, this table is constituted by a number column 611, an electronic transaction ID column 612, and a status column 613. Here, the status column 613 indicates "END" when an electronic transaction is finished, or "UNDER PROCESS" when an electronic transaction is now being processed, those indicated states being stored.

The number of the electronic transaction ID column 612 coincide with that of the electronic transaction ID 511 in FIG. 15.

The electronic transaction procedure selection table 71 is used to select an electronic transaction procedure corresponding to an electronic transaction. As shown in FIG. 17, this table is constituted by settlement information (a settlement means column 711 and a financial institution name column 712), and an electronic transaction procedure ID column 713.

The number of the selected electronic transaction procedure ID 713 corresponds to those of the electronic transaction procedure ID 421, 441, 512 in FIGS. 12, 13, 15.

If a buyer selects "SETTLEMENT MEANS 711= CREDIT SETTLEMENT", "FINANCIAL INSTITUTION NAME=CREDIT A" as settlement information, an electronic transaction procedure of "ELECTRONIC TRANSACTION PROCEDURE ID=123456" is selected, and the electronic deal is performed according to this selected procedure. The electronic transaction procedure selection table 71 is previously generated and stored in the storage device 114 of the server 11.

The operations of this embodiment according to the flow charts in FIGS. 4 to 9 will be described with reference to FIGS. 2, 3 and 10 to 17.

It is assumed that the offer/retrieval/decision of information about the goods to be treated in electronic dealings are already finished. In addition, an electric deal is started from the electronic transaction client 12.

All the processes of an electronic transaction will be described with reference to FIGS. 4 to 6.

Step 2201

A buyer inputs settlement information by the input unit 122 of the electronic transaction client 12. The settlement information is constructed by information of settlement means and financial institution name.

The settlement means includes, for example, two kinds of settlement by credit and direct payment to bank.

Thus, a buyer inputs, or selects, for example, "CREDIT SETTLEMENT" by the input unit 122 of the electronic transaction client 12 and "CREDIT A" as a financial institution.

Step 2202

The electronic transaction client 12 transmits the settlement information inputted at step 2201 to the electronic transaction server 11 through the communication network 15.

Step 2101

The electronic transaction server 11 receives the settlement information from the electronic transaction client 12 through the communication network 15.

Step 2102

The electronic transaction sever 11 generates an electronic transaction ID for identifying this electronic deal. For example, it generates "ELECTRONIC TRANSACTION ID=19960101".

Step 2103

The electronic transaction server 11 retrieves the electronic transaction procedure 31 corresponding to the settlement information from the storage device 114 on the basis of the settlement information received from the electronic transaction client 12 and the electronic transaction procedure selection table 71.

If "CREDIT SETTLEMENT" AND "CREDIT A" are selected as settlement information by the buyer, "ELECTRONIC TRANSACTION PROCEDURE ID=1234567" is obtained from the electronic transaction procedure selection table 71, and the electronic transaction procedure 31 specified by this "ELECTRONIC TRANSACTION PROCEDURE ID=1234567" is retrieved from the storage device 114.

Step 2104

The electronic transaction server 11 generates the progression table 51 shown in FIG. 15 on the basis of the order table 312 included in the retrieved electronic transaction procedure 31.

This progression table 51 indicates that the clients 12, 13 and 14 of the buyer, seller and financial institution are respectively required to execute the process designated by the process name column 515 in the order according to the order column 513.

In other words, first the buyer, or client 12 makes "ORDER INPUT PROCESS" indicated at "PROCESS PROCEDURE 1" of "DUTY PROCEDURE 1", second the seller, or client 13 makes "ORDER ACCEPTANCE/AUTHORIZATION REQUEST PROCESS" indicated at "PROCESS PROCEDURE 1" of "DUTY PROCEDURE 2", and third the financial institution, or client 14 makes "AUTHORIZATION PROCESS" indicated at "PROCESS PROCEDURE 1" of "DUTY PROCEDURE 3". Fourth the buyer, or client 13 makes "AUTHORIZATION CONFIRMATION/ORDER RESULT TRANSMISSION REQUEST PROCESS" indicated at "PROCESS PROCEDURE 2" of "DUTY PROCEDURE 2", and fifth the buyer, or client 12 makes "ORDER CONFIRMATION PROCESS" indicated at "PROCESS PROCEDURE 2" of "DUTY PROCEDURE 1".

Moreover, sixth the seller, client 13 makes "SETTLEMENT REQUEST PROCESS" indicated at "PROCESS PROCEDURE 3" of "DUTY PROCEDURE 2", seventh the financial institution, or client 14 makes "SETTLEMENT PROCESS" indicated at "PROCESS PROCEDURE 2" of "DUTY PROCEDURE 3", eighth the seller, or client 13 makes "SETTLEMENT CONFIRMATION/DEAL RESULT TRANSMISSION PROCESS" indicated at "PROCESS PROCEDURE 4" of "DUTY PROCEDURE 2", and ninth the buyer, or client 12 makes "DEAL CONFIRMATION PROCESS" indicated at "PROCESS PROCEDURE 3" of "DUTY PROCEDURE 1".

Step 2105

The electronic transaction server 11 controls the storage device 114 to store the generated progression table 51.

Step 2106

The electronic transaction server 11 writes "UNDER PROCESS" in the status column 613 of the electronic transaction management table 61 at the location corresponding to the.electronic transaction ID generated at step 2102.

Step 2107

The electronic transaction server 11 transmits the progression table 51 and the duty procedure 313 through the communication network 15 to the clients (here, the electronic transaction clients 12, 13, 14) included in the participants table 311 of the electronic transaction procedure 31 retrieved at step 2103.

Thus, the electronic transaction procedure corresponding to the settlement information selected by the buyer is distributed to the participants included in the participants table 311 of the electronic transaction procedure 31, or the electronic transaction clients 12, 13 and 14. The distributed procedure specifically includes the duty procedure 313 to be executed by each client 12, 13, 14, and the progression table 51 which indicates the order of execution for the duty procedure.

Then, each client executes the process indicated in each duty procedure in the order defined in the progression table 51.

Steps 2203, 2301, 2401

The electronic transaction clients 12, 13 and 14 receive the progression table 51 and duty procedure 313 from the electronic transaction server 11 through the communication network 15.

Steps 2204, 2302, 2402

The electronic transaction clients 12, 13 and 14 write "UNDER PROCESS" in the status column 613 of the electronic transaction management tables 61 within their storage devices 124, 134 and 144 at the locations of the electronic transaction ID corresponding to the electronic transaction ID 511 included in the received progression table 51. The electronic transaction management table 61 may have a possibility of having different contents depending on a deal associated with each of clients 12, 13 and 14 and server 11.

Steps 2205, 2303, 2403

The electronic transaction clients 12, 13 and 14 respectively force the storage devices 124, 134 and 144 to store the received progression table 51 and duty procedure 313.

Step 2108

The electronic transaction server 11 executes an electronic transaction server process. This electronic transaction server process will be described later with reference to FIG. 7.

Steps 2206, 2304, 2404

The electronic transaction clients 12, 13 and 14 execute an electronic transaction process. This electronic transaction process will be described later with reference to FIGS. 8 and 9.

Electronic Transaction Server Process

An electronic transaction server process at step 2108 will be described with reference to FIG. 7.

The electronic transaction server 11 receives data concerned with dealings from participants (electronic transaction clients 12, 13, 14) (at step 3101), and replaces the progression table stored in the storage device 114 by that included in the received data (at step 3102).

In other words, the latest progression table used in the previous electronic deal is replaced by the progression table 51 which is going to be used in a new deal.

Then, decision is made of whether "END" identifier is included in the received data (at step 3103). If it is included, the program goes to step 3104. If it is not included, the program goes to step 3101. In this case, "END" identifier means "END" of electronic deal.

At step 3104, the state change from "UNDER PROCESS" to "END" is made at the location of electronic transaction ID in the status column 613 corresponding to the electronic transaction ID 51 included in this received progression table 51 of the electronic transaction management table 61.

Then, the electronic transaction procedure 31 corresponding to the electronic transaction procedure ID 512 is retrieved from the storage device 114 on the basis of the electronic transaction procedure ID 512 included in the progression table 51 (at step 3105).

Thereafter, the progression table 51 and end identifier are transmitted to the participants included in the participants table 311 of the retrieved electronic transaction procedure 31, and this electronic transaction is completed (at step 3106)

Electronic Transaction Process

The electronic transaction process which each client 12, 13, 14 executes will be described with reference to FIGS. 8 and 9. Here, since the operations of the electronic transaction clients are the same, the typical operation of the client 12 will be mentioned below.

The electronic transaction client 12 retrieves a participant who first processes, with reference to the progression table 51 received from the server 11 (at step 3201).

Decision is made of whether a client concerned corresponds to the participant who first processes (at step 3202). If it is so, the program goes to step 3207. If it is not so, the program goes to step 3203.

If a client concerned is not the participant who first processes, data is received from other participants or server 11 (at step 3203).

The progression table 51 included in the received data is stored in the storage device 124 to replace the previous progression table (at step 3204).

Then, decision is made of whether the end identifier is included in the received data (at step 3205). If it is so, the program goes to step 3206 since this electronic deal ends. If it is not so, the program goes to step 3207.

If the end identifier is included in the received data, the change from "UNDER PROCESS" to "END" is made at the location of the electronic transaction ID in the status column 613 of the electronic transaction management table 61 which the electronic transaction client 12 itself has, corresponding to the electronic transaction ID 511 included in the received progression table 51 (at step 3206). From this, it will be understood that all clients end the corresponding electronic deal by transmitting the end identifier from the server 11 to each client 12, 13, 14. In this case, since the electronic transaction procedure 31, if remained within the storage device 114, might be deciphered and abused, the status 613 is changed from "UNDER PROCESS" to "END" , and then the electronic transaction procedure 31 is erased from the storage device 114.

If the end identifier is not included in the received data, the arrival time 516 of data is written in the progression table 51 (at step 3207).

Then, the duty procedure 313 is retrieved from within the storage device 124 on the basis of the electronic transaction procedure ID 512 included in the progression table 51 (at step 3208). In addition, the process procedure 314 to be used this time is retrieved from the retrieved duty procedure 313 on the basis of the process names column 515 included in the progression table 51 (at step 3209).

Thereafter, the retrieved process procedure 314 is analyzed by the analyzer 21 (at step 3210), and the processor 22 executes the process procedure 314 analyzed by the analyzer 21 by using the process library 23, producing a message on the basis of the message generating method 434 of the process procedure 314 (at step 3211).

Here, this produced message includes, if it is for an order input process, information about a buyer containing a name, address, telephone number, mail address and IP address, delivery address information (a name, address, telephone number, mail address and IP address) for the case where the address for delivery is different from that of the buyer, information associated with a seller (a store name, store ID, IP address and so on), information concerned with a financial institution (an institution name, institution ID, IP address and so on), information about goods to be purchased which contain total purchase amounts, total purchase number, brand name, commodity code, unit cost of each commodity and purchase number of each commodity, information about settlement (e.g., for credit settlement; credit number, validity period, how to pay and so on, and for direct payment to a bank; bank account number, branch name, deposit items and so on) which is ciphered on the buyer side by use of an open key of a financial institution and signed in a digital form by the buyer, transaction ID for identifying a deal at a seller, time at which a buyer transmitted a message, digital signature indicating that the buyer himself transmitted, and so on.

In addition, the message includes, if it is for order acceptance/authorization request, information about a buyer, information associated with a seller, information about a financial institution, information associated with settlement which is ciphered on the buyer side by use of an open key of a financial institution and signed in a digital form by the buyer, transaction ID for identifying a deal at a seller, time at which a buyer transmitted a message, digital signature indicating that the buyer himself transmitted, and so on.

Then, the process completion time 517 is written in the progression table 51 (at step 3212), and the next participant is retrieved from the progression table 51 (at step 3213).

At step 3214, if the next participant is present, the program goes to step 3215, and if it is not present, the program goes to step 3217.

If the next participant is present, the processor 22 makes use of the communication library 24 and transmits to the next participant the message produced by the processor 22 and the progression table 51 through the communication network 15 on the basis of the message transmission method 436 included in the process procedure 314 (at step 3215). Then, the progression table 51 is transmitted to the electronic transaction server 11 through the communication network 15 (at step 3216), and the program goes to step 3203.

On the other hand, if the next participant is not present, the end identifier and the progression table 51 are transmitted to the electronic transaction server 11 through the communication network 15 (at step 3217), and the program goes to step 3203. If the end of the deal is recognized by analyzing the progression table 51 of the data which the electronic transaction server 11 received, the end identifier is not necessary. In this case, however, the processing speed becomes slow.

Thus, according to this embodiment, since the progression table 51 is generated at each electronic deal and used to manage the situations in which each electronic transaction client 12, 13, 14 processes, the situations in which a deal progresses can be independently managed even though the electronic transaction procedure is changed. In addition, the electronic transaction procedure itself can be prevented from being complicated, and the burden on the operation for its generation can be decreased.

The second embodiment of the invention in which the electronic transaction procedure is transmitted together with a message will be described in detail with reference to drawings.

Figure 18:
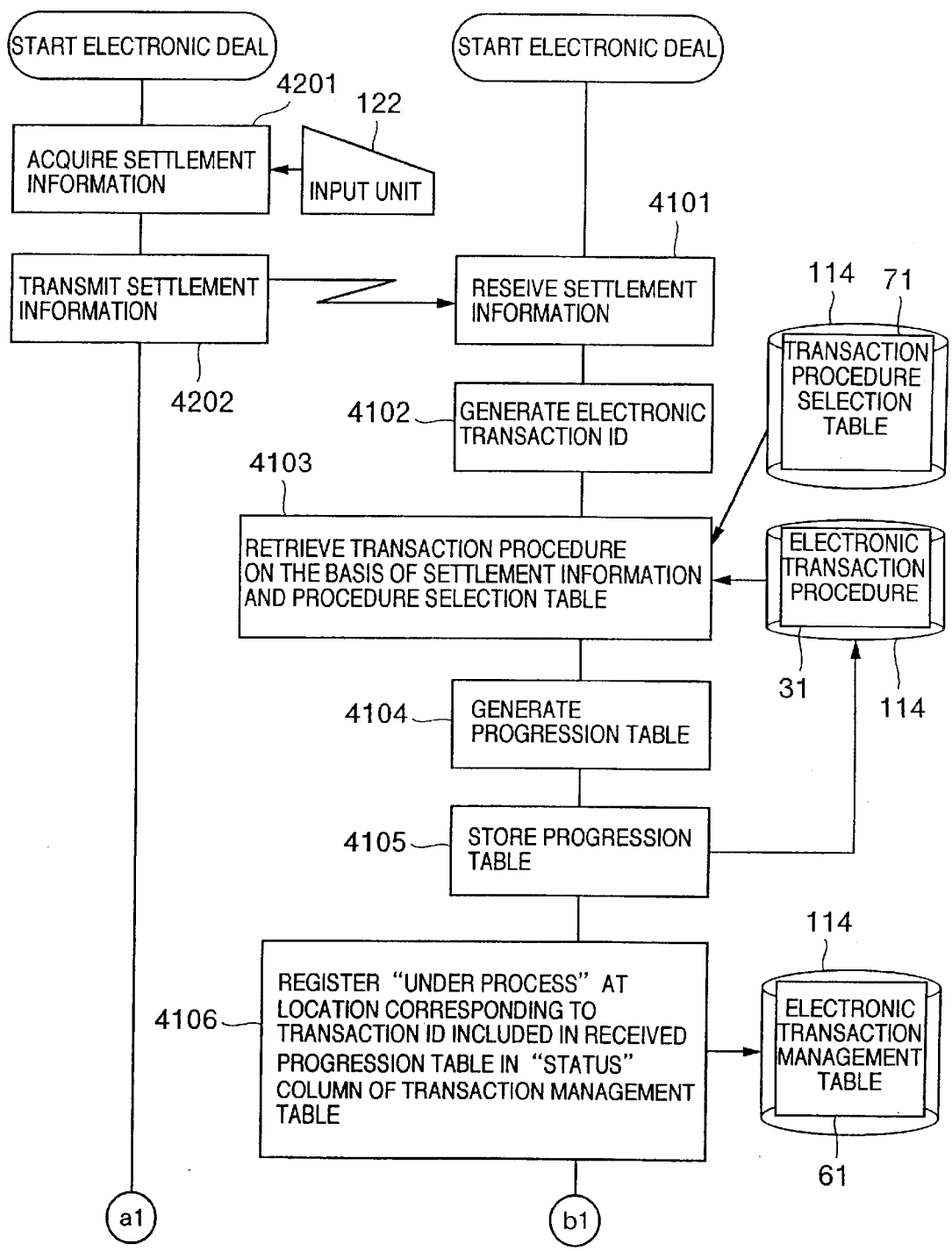
FIG. 18 is a flow chart for the electronic transaction client and server in the second embodiment of the invention.
Figure 19:
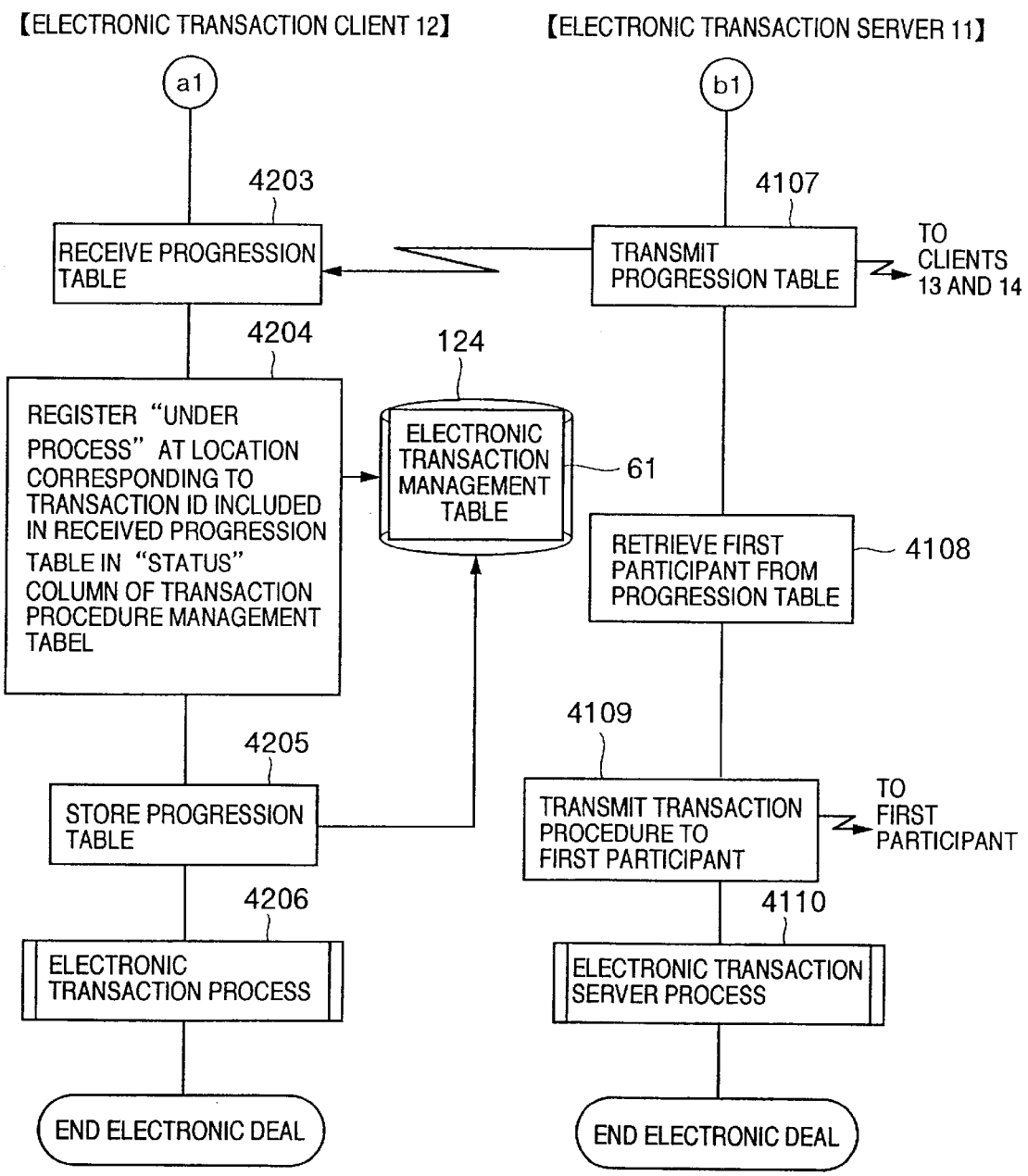
FIG. 19 is a flow chart continued from FIG. 18.
Figure 20:
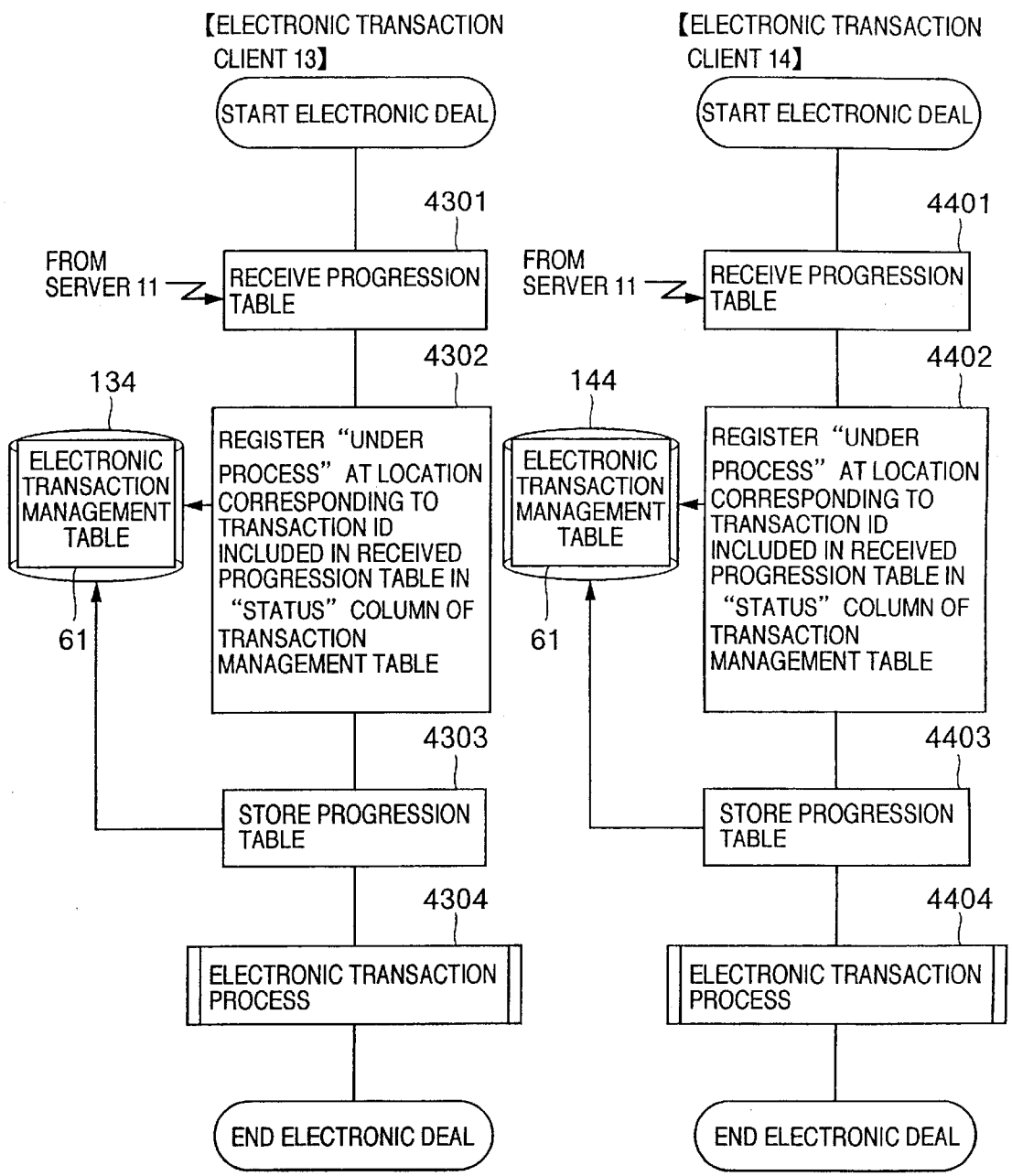
FIG. 20 is a flow chart associated with FIG. 18.
Figure 21:
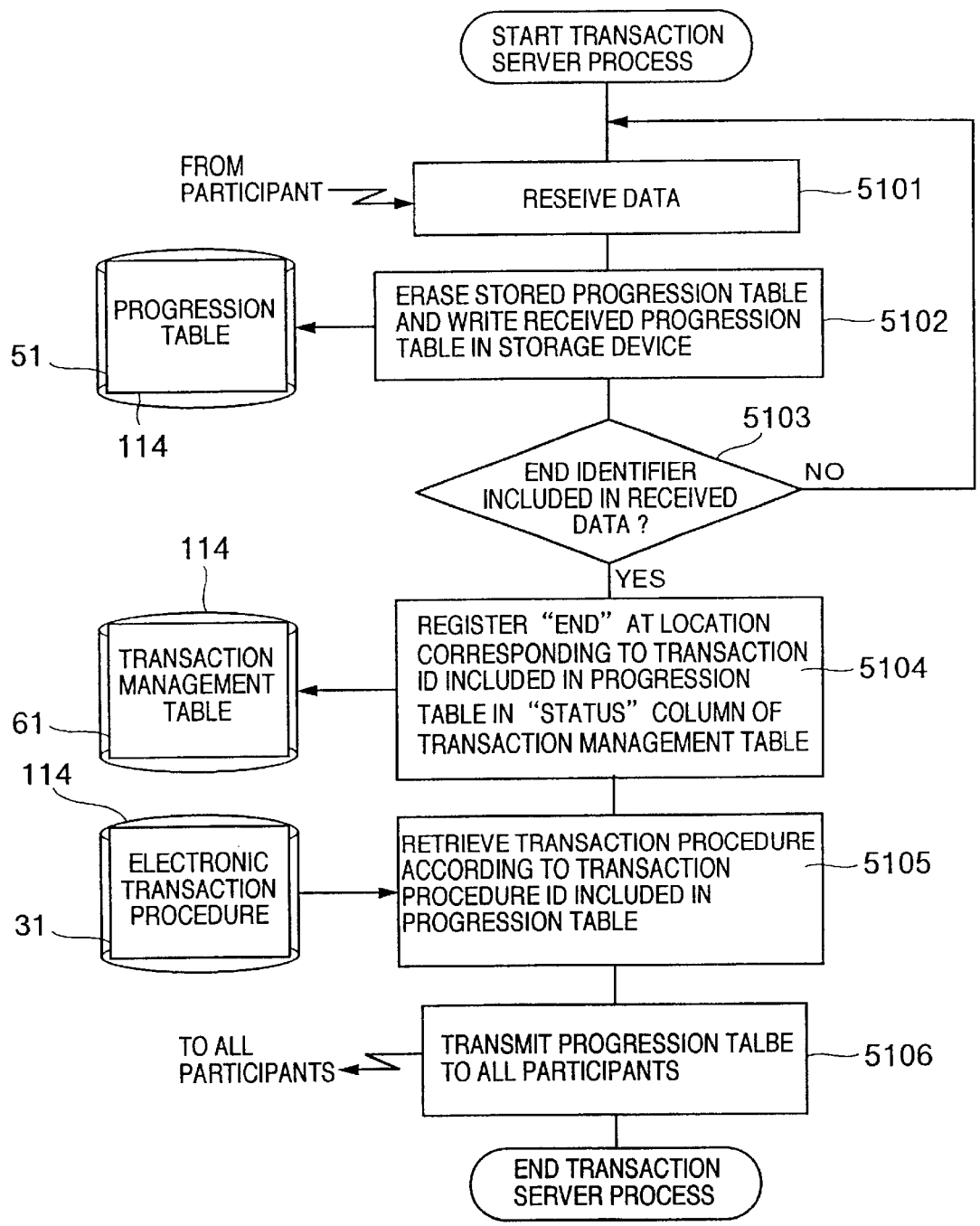
FIG. 21 is a flow chart for the details of the electronic transaction server process in FIG. 18.
Figure 22:
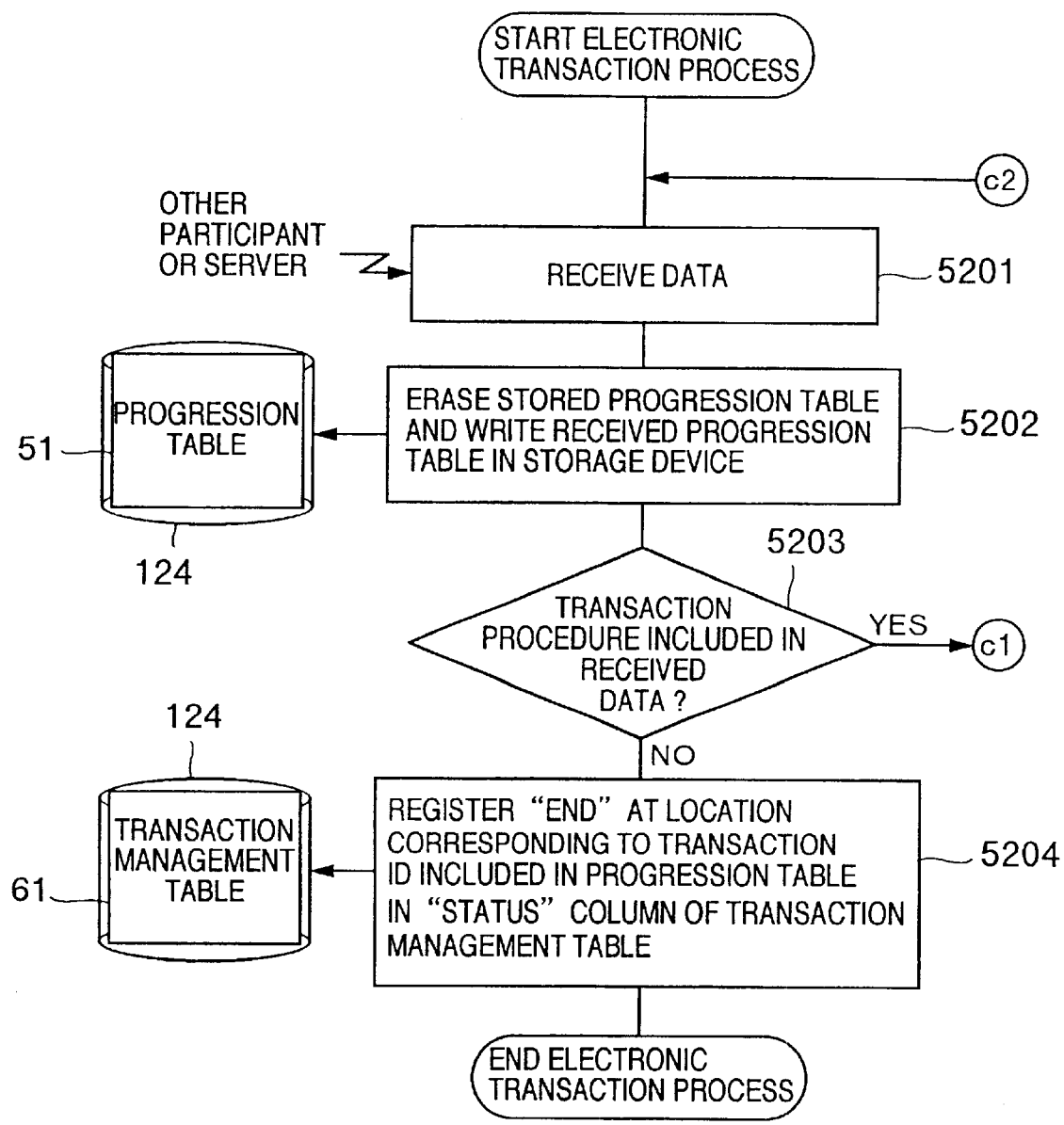
FIG. 22 is a flow chart for the details of the electronic transaction process in FIG. 18.
Figure 23:
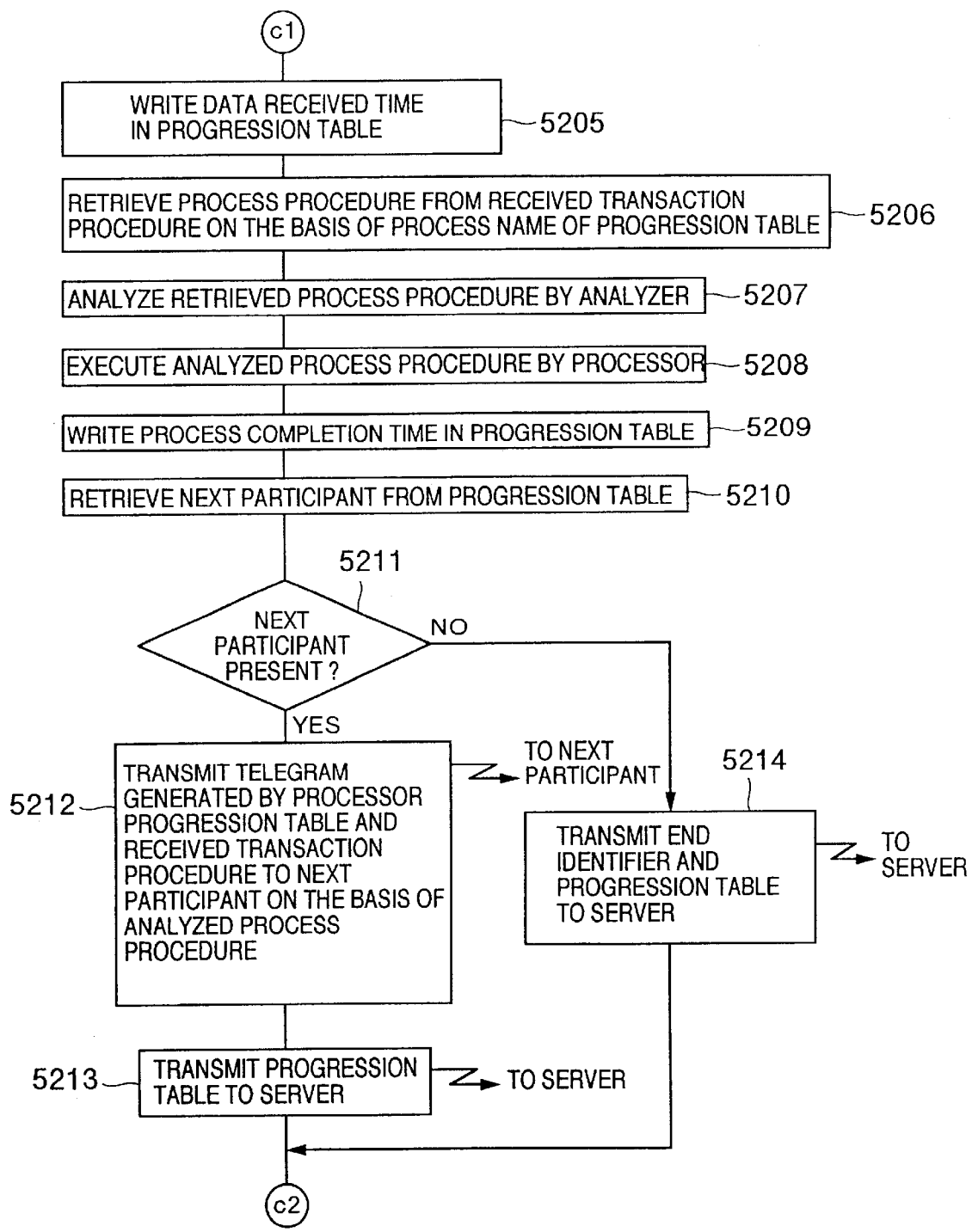
FIG. 23 is a flow chart continued from FIG. 22.

FIGS. 18 to 23 are flow charts to which reference is made in explaining the second embodiment of the invention. Of these figures, FIGS. 18 and 19 are flow charts for the operation including the data transmission and reception between the electronic transaction client 12 (buyer) and the electronic transaction server 11, FIG. 20 is a flow chart for the operation including the data transmission and reception between the electronic transaction client 13 (seller) and the electronic transaction client 14 (financial institution), and FIG. 21 is a flow chart for the internal process of the electronic transaction server 11. Also, FIGS. 22 and 23 are flow charts for electronic transaction process in the electronic transaction clients 12, 13, 14.

The whole arrangement of the electronic transaction system including the apparatus or units for realizing this embodiment is assumed to be as shown in FIG. 2, and the module structure of each client 12, 13, 14 is also assumed to be as shown in FIG. 3.

In addition, the electronic transaction procedure will be described with reference to FIGS. 10 to 14, the progression table to FIG. 15, the electronic transaction management table to FIG. 16, and the electronic transaction procedure selection table to FIG. 17.

The operations of this embodiment according to the flow charts of FIGS. 18 to 23 will be described with reference to FIGS. 2, 3 and FIGS. 10 to 17.

The offer/retrieval/decision of information about goods to be treated in an electronic deal are assumed to be finished. Moreover, the electronic deal is assumed to be started from the electronic transaction client 12.

First, all the process for the electronic deal will be described with reference to FIGS. 18 to 20.

Step 4201

A buyer inputs settlement information by the input unit 122 of the electronic transaction client 12. Here, the buyer inputs a settlement means (credit settlement or direct payment to a bank is selected) and the name of a financial institution (the name of a credit company or bank).

Step 4202

The electronic transaction client 12 transmits the settlement inputted at step 4201, through the communication network 15 to the electronic transaction server 11.

Step 4101

The electronic transaction server 11 receives the settlement information from the electronic transaction client 12 through the communication network 15.

Step 4102

The electronic transaction server 11 generates the electronic transaction ID for identifying this electronic transaction.

Step 4103

The electronic transaction server 11 retrieves the electronic transaction procedure 31 from the storage device 114 on the basis of the settlement information received from the electronic transaction client 12 and the electronic transaction procedure selection table 71.

Step 4104

The electronic transaction server 11 generates the progression table 51 as shown in FIG. 15 on the basis of the order table 312 included in the retrieved electronic transaction procedure 31.

Step 4105

The electronic transaction server 11 causes the generated progression table 51 to be stored in the storage device 114.

Step 4106

The electronic transaction server 11 writes "UNDER PROCESS" at the location of the electronic transaction ID corresponding to the electronic transaction ID generated a t step 4102 in the status column 613 of the its own electronic transaction management table 61, with the previous contents being erased therefrom.

Step 4107

The electronic transaction server 11 transmits the progression table 51 through the communication network 15 to the participants (here, the electronic transaction clients 12, 13, 14) included in the participants table 311 of the electronic transaction procedure 31 retrieved at step 4103.

Steps 4203, 4301, 4401

The electronic transaction clients 12, 13 and 14 receive the progression table 51 from the electronic transaction server 11 through the communication network 15.

Steps 4204, 4302, 4402

The electronic transaction clients 12, 13 and 14 write "UNDER PROCESS" at the location of the electronic transaction ID corresponding to the electronic transaction ID 511 included in the received progression table 51, in the status column 613 of their own electronic transaction management table 61 stored within the storage device 124, 134, 144, with the previous contents being erased therefrom.

Steps 4205, 4303, 4403

The electronic transaction clients 12, 13 and 14 force the received progression table 51 to be stored in the storage devices 124, 134 and 144, respectively.

Step 4108

The electronic transaction server 11 retrieves the first participant from the progression table 51.

Step 4109

The electronic transaction server 11 transmits the electronic transaction procedure 31 retrieved at step 4103, through the communication network 15 to the retrieved first participant.

Step 4110

The electronic transaction server 11 executes the electronic transaction server process. This electronic server process will be mentioned later with reference to FIG. 21.

Steps 4207, 4304, 4404

The electronic transaction clients 12, 13 and 14 execute an electronic transaction process. This electronic transaction process will be described later with reference to FIGS. 22 and 23.

Electronic Transaction Server Process

The electronic transaction server process will be described with reference to FIG. 21.

The electronic transaction server 11 receives data from a participant (at step 5101), and causes the storage device 114 to erase the previous progression table and newly store the progression table 51 included in the received data (at step 5102).

In other words, the progression table used in the previous electronic deal is replaced by the progression table 51 received from the participant. Thus, the server 11 always has the newest progression table.

Then, decision is made of whether the "END" identifier is included in the received data (at step 5103). If it is included, the program goes to step 5104. If it is not included, the program goes to step 5101.

If the "END" identifier is included in the received data, the change from "UNDER PROCESS" to "END" is made at the location of the electronic transaction ID corresponding to the electronic transaction ID 511 included in this received progression table 51, in the status column 613 of its own electronic transaction management table 61 (at step 5104).

The electronic transaction procedure 31 corresponding to the electronic transaction procedure ID 512 is retrieved from the storage device 114 on the basis of the electronic transaction procedure ID 512 included in the progression table 51 (at step 5105).

Then, the progression table 51 meaning the end of the deal is transmitted to the participants included in the participants table 311 of the retrieved electronic transaction procedure 31, and this electronic deal ends (at step 5106).

Electronic Transaction Process

The electronic transaction process will be described with reference to FIGS. 22 and 23. Here, since the operations of the electronic transaction clients 12, 13 and 14 are the same, the operation of the client 12 as a typical example will be mentioned below.

The electronic transaction client 12 receives data from another participant or electronic transaction server 11 (at step 5201), and replaces the progression table stored in the storage device 124 by the progression table 51 included in the received data (at step 5202).

In other words, the progression table used in the previous transaction process is erased, and instead the new progression table 51 is stored in the storage device.

Then, decision is made of whether the electronic transaction procedure 31 is included in the received data (at step 5203). If it is included, the program goes to step 5205. If it is not included, the program goes to step 5204.

If the electronic transaction procedure 31 is not included in the received data, the sever 11 transmits the progression table indicative of the end of this electronic deal. Therefore, the change from "UNDER PROCESS" to "END" is made at the location of the electronic transaction ID corresponding to the electronic transaction ID 511 included in this received progression table 51, in the status column 613 of the electronic transaction management table 61, and this electronic deal ends (at step 5204).

If the electronic transaction procedure 31 is included in the received data, the data is from the client that has completed the process just before. Therefore, the arrival time 516 at which the data was received is written in the progression table 51 (at step 5205).

Then, the process procedure 314 to be used this time is retrieved from this received electronic transaction procedure 31 on the basis of the process name 515 included in the progression table 51 (at step 5206).

The retrieved process procedure 314 is analyzed by the analyzer 21 (at step 5207). The processor 22 executes the process procedure 314 analyzed by the analyzer 21 by use of the process library 23, and a message is generated on the basis of the message generating method 434 of the process procedure 314 (at step 5208).

The process completion time 517 is written in the progression table 51 (at step 5209). The next participant name 514 is retrieved from the progression table 51 (at step 5210).

If the next participant is present, the program goes to step 5212. If the next participant is not present, the program goes to step 5214 (at step 5211).

If the next participant is present, the processor 22 transmits to the participant the message produced by the processor 22, the progression table 51 and the received electronic transaction procedure 31 through the communication network 15 on the basis of the message transmission method 436 included in the process procedure 314 and by use of the communication library 24 (at step 5212).

The progression table 51 is transmitted to the electronic transaction server 11 through the communication network 15 (at step 5213), and the program goes back to step 5201.

If the next participant is not present, the "END" identifier and the progression table 51 are transmitted to the electronic transaction server 11 through the communication network 15 (at step 5214), and the program goes back to step 5201.

Thus, according to this embodiment, since the electronic transaction procedure is not distributed to the participants at a time, but distributed together with the message, it is not necessary for the electronic transaction clients to manage the electronic transaction procedure. Thus, the electronic transaction procedure can be prevented from being falsified or changed otherwise on the electronic transaction client side. In this embodiment, it should be noted that the transmission of the progression table from the server 11 to each client is made for the purpose of starting or ending the electronic deal.

Although the electronic transaction procedure is transmitted to the next participant at step 5212, the already finished process procedure may be removed here before transmission. Thus, the amount of data being transmitted can be reduced. In addition, if the final participant supplies all the process procedure back to the server 11, the end identifier can be omitted. In this case, however, the communication traffic between the server and the clients is increased.

The third embodiment of the invention in which the electronic transaction procedure is transmitted together with a message will be described in detail with reference to drawings.

Figure 24:
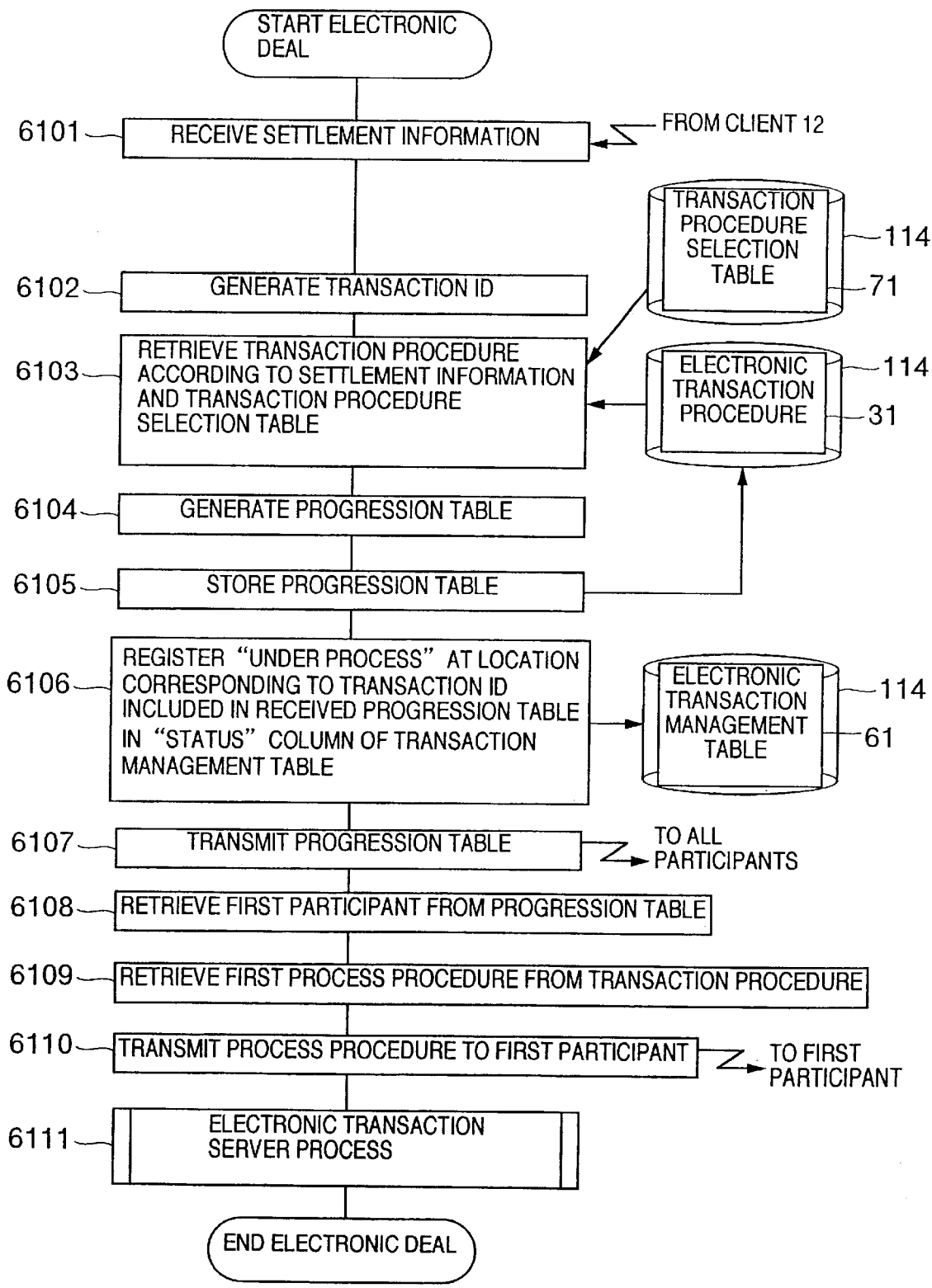
FIG. 24 is a flow chart for the electronic transaction server in the third embodiment of the invention.
Figure 25:
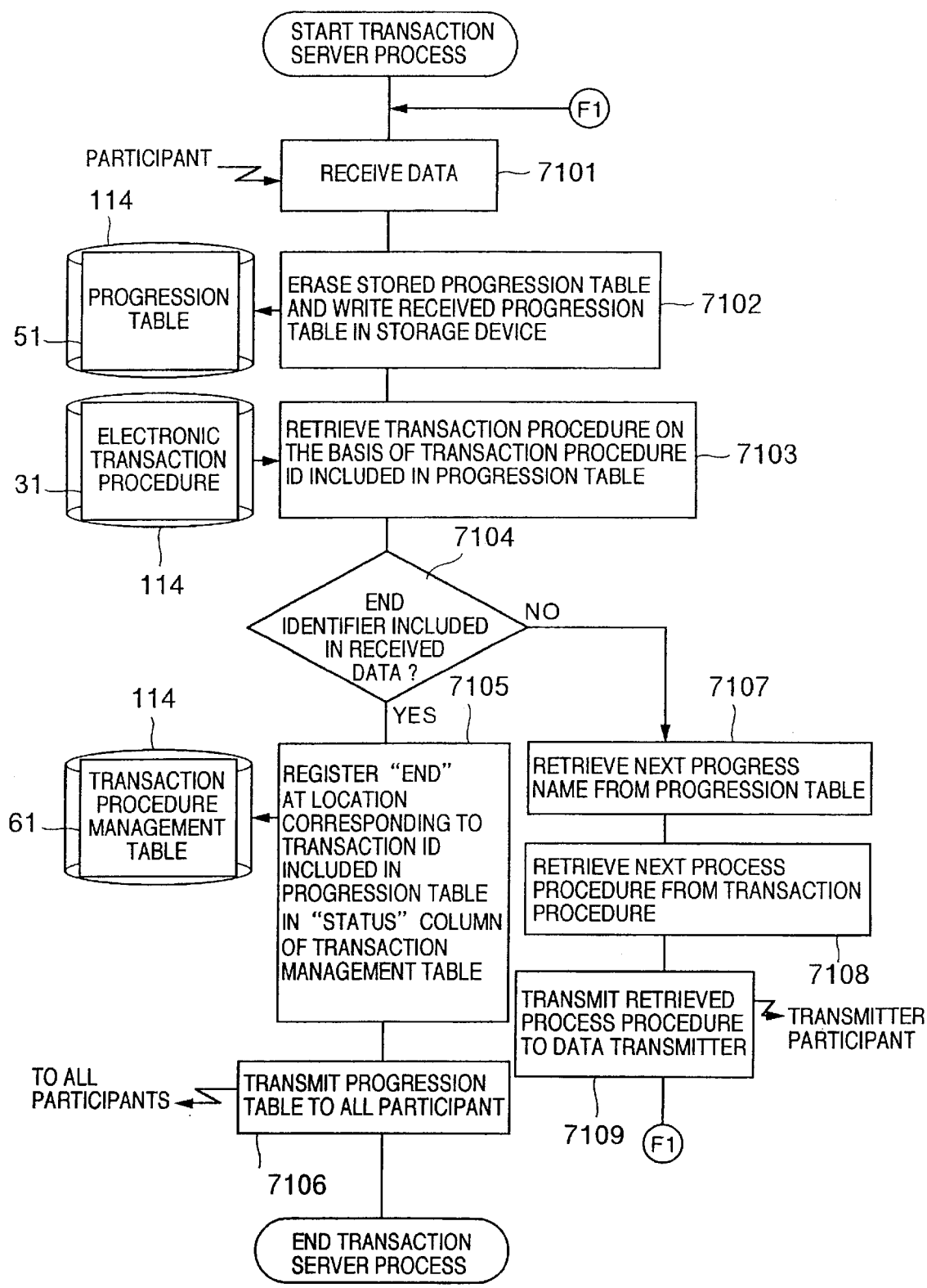
FIG. 25 is a flow chart for the details of the electronic transaction server process in FIG. 24.
Figure 26:
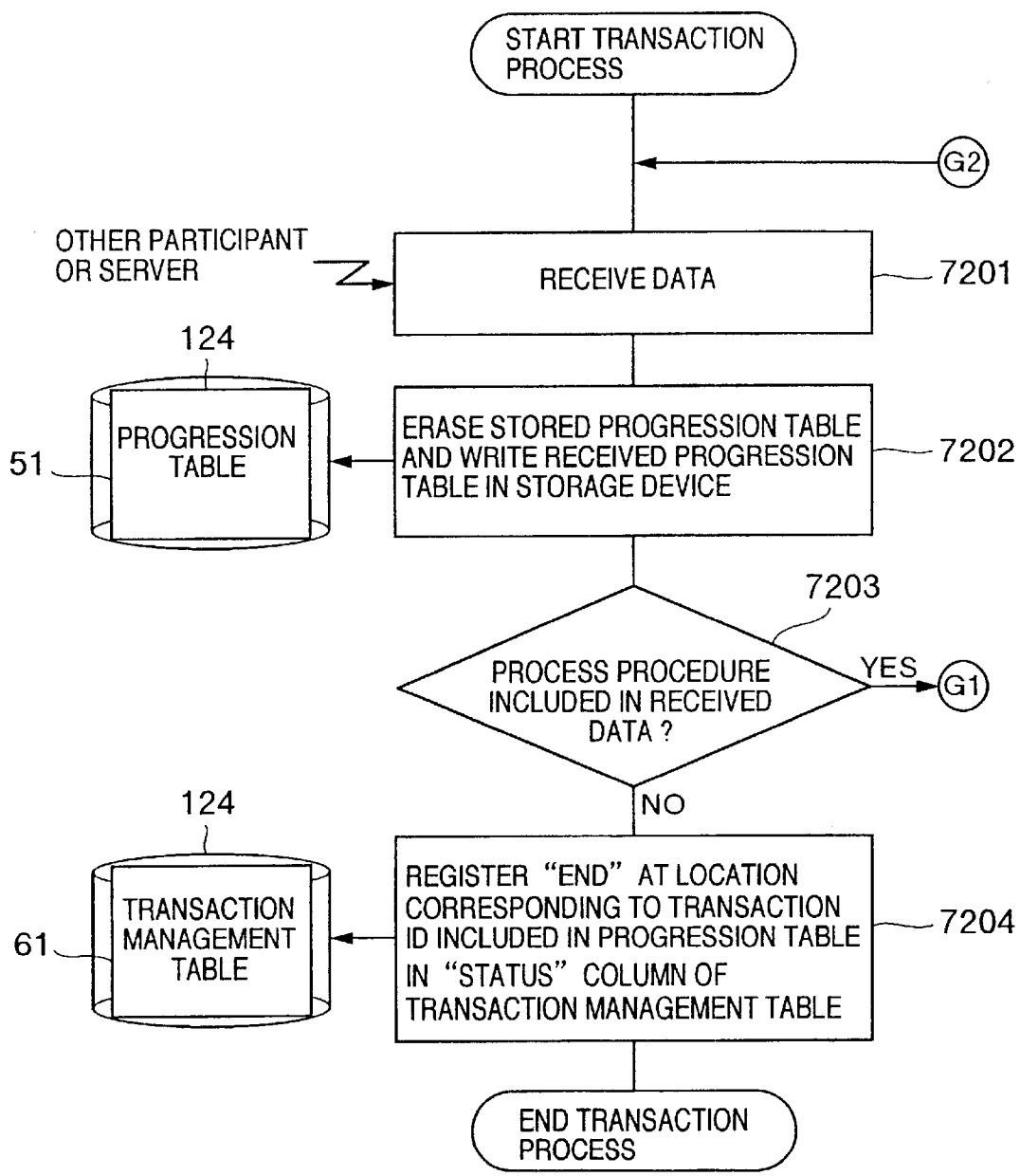
FIG. 26 is a flow chart for the details of the electronic transaction process in FIG. 24.
Figure 27:
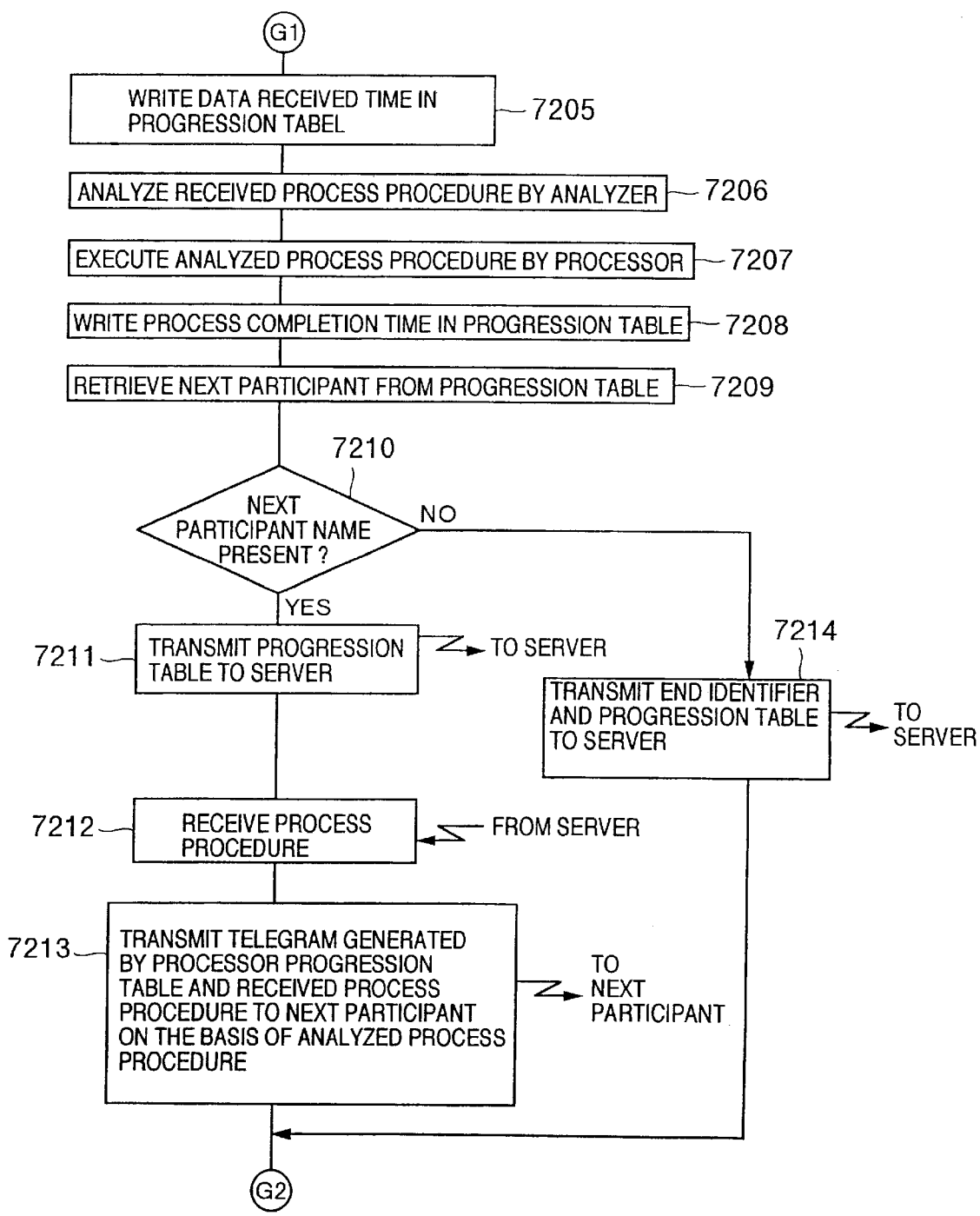
FIG. 27 is a flow chart continued from FIG. 26.

FIGS. 24 to 27 are flow charts for the operations according to the third embodiment of the invention. Of these figures, FIG. 24 is a flow chart of the electronic transaction server 11, FIG. 25 is a detailed flow chart of the electronic transaction server process in the electronic transaction server 11, and FIGS. 26 and 27 are detailed flow charts of the electronic transaction process in the electronic transaction client 12.

All the process in the electronic transaction client 12 will be mentioned with reference to the flow chart of FIG. 18. In addition, it is assumed that the whole structure of the electronic transaction system including the apparatus or units for realizing this embodiment is as shown in FIG. 2 and that the module construction of each client 12, 13, 14 is as shown in FIG. 3.

The electronic transaction procedure can be explained with reference to FIGS. 10 to 14, the progression table to FIG. 15, the electronic transaction management table to FIG. 16, and the electronic transaction procedure selection table to FIG. 17.

The operation of this embodiment will be described with reference to the flow charts of FIGS. 24 to 27. The offer/retrieval/decision of information about the goods to be treated in electronic dealings are assumed to be already finished. Also, the electronic deal is started from the electronic transaction client 12.

First, all the process in the electronic transaction server 11 will be described with reference to FIG. 24.

Step 6101

The electronic transaction server 11 receives settlement information from the electronic transaction client 12 through the communication network 15.

Step 6102

The electronic transaction server 11 generates the electronic transaction ID.

Step 6103

The electronic transaction server 11 retrieves the electronic transaction procedure 31 corresponding to the settlement information from the storage device 114 on the basis of the received settlement information and the electronic transaction procedure selection table 71.

Step 6104

The electronic transaction server 11 generates the progression table 51 shown in FIG. 15 on the basis of the order table 312 included in the retrieved electronic transaction procedure 31.

Step 6105

The electronic transaction server 11 causes the storage device 114 to store the generated progression table 51.

Step 6106

The electronic transaction server 11 writes "UNDER PROCESS" at the location of the electronic transaction ID corresponding to the electronic transaction ID generated at step 6102 in the status column 613 of its own electronic transaction management table 61.

Step 6107

The electronic transaction server 11 transmits the generated progression table 51 through the communication network 15 to the participants (here, the electronic transaction clients 12, 13, 14) included in the participants table 311 of the electronic transaction procedure 31 retrieved at step 6103.

Step 6108

The electronic transaction server 11 retrieves the first participant from the progression table 51.

Step 6109

The electronic transaction server 11 retrieves the process procedure 314 which the first participant executes, from the retrieved electronic transaction procedure.

Step 6110

The electronic transaction server 11 transmits the retrieved process procedure 314 through the communication network 15 to the first participant.

Step 6111

The electronic transaction server 11 executes the electronic transaction server process shown in FIG. 25.

Electronic Transaction Server Process

The electronic transaction server process will be described with reference to FIG. 25.

The electronic transaction server 11 receives data from the participant (at step 7101), and replaces the progression table stored in the storage device 114 by the progression table 51 included in the received data (step 7102).

The electronic transaction procedure 31 corresponding to the electronic transaction procedure ID 512 is retrieved from the storage device 114 on the basis of the electronic transaction procedure ID 512 included in the progression table 51 (at step 7103).

Then, decision is made of whether the end identifier is included in the received data (at step 7104). If it is included, the program goes to step 7105. If it is not included, the program goes to step 7107.

If the end identifier is included in the received data, the change from "UNDER PROCESS" to "END" is made at the location of the electronic transaction ID corresponding to the electronic transaction ID 511 included in this received progression table 51, in the status column 613 of its own electronic transaction management table 61 (at step 7105). Thereafter, the progression table 51 indicative of the end of the deal is transmitted to the participants included in the participants table 311 of the retrieved transaction procedure 31 (at step 7106), and this deal ends.

If the end identifier is not included in the received data, the next process name 515 is retrieved from the progression table 51 (at step 7107). The process procedure 314 corresponding to the next process name 515 is retrieved from the electronic transaction procedure 31 retrieved at step 7103 (at step 7108).

Then, the retrieved process procedure 314 is transmitted to the participant that transmitted data at step 7101 (at step 7109).

Electronic Transaction Process

The electronic transaction process will be described with reference to FIGS. 26 and 27. Since the operations of the electronic transaction clients 12, 13 and 14 are the same, the operation of the electronic transaction client 12 as a typical example will be described below.

The electronic transaction client 12 receives data from another client or electronic transaction server 11 (at step 7201), and replaces the progression table stored in the storage device 124 by the progression table 51 included in the received data (at step 7202). In other words, the progression table 51 used in the previous electronic deal process is erased, and instead the new progression table 51 is stored in the storage device.

Then, decision is made of whether the process procedure 314 is included in the received data (at step 7203). If it is included, the program goes to step 7205, and it is not included, the program goes to step 7204 (at step 7203).

If the process procedure 314 is not included in the received data, the progression table indicative of the end of the deal is transmitted from the server 11. Thus, the change from "UNDER PROCESS" to "END" is made at the location of the electronic transaction ID corresponding to the electronic transaction ID 511 included in this received progression table 51 in the status column 613 of its own electronic transaction management table 61, and this deal ends (at step 7204).

If the process procedure 314 is included in the received data, the data has been received from the participant just before. Therefore, the arrival time 516 of this received data is written in the progression table 51 (at step 7205).

Then, the received process procedure 314 is analyzed by the analyzer 21 (at step 7206). The processor 22 executes the process procedure 314 analyzed by the analyzer 21 by use of the process library 23, and generates a message on the basis of the message generating method 434 of the process procedure 314 (at step 7207).

The process completion time 517 is written in the progression table 51 (at step 7208). The next participant 514 is retrieved from the progression table 51 (at step 7209).

If the next participant is present, the program goes to step 7211, and if it is not present, the program goes to step 7214 (at step 7210).

If the next participant is present, the progression table 51 is transmitted through the communication network 15 to the electronic transaction server 11 (at step 7211).

Then, the process procedure 314 for the next participant is received from the electronic transaction server 11 through the communication network 15 (at step 7212).

The processor 22 transmits to the next participant the message generated at the processor 22, the progression table 51 and the process procedure 314 received at step 7212 through the communication network 15 on the basis of the message transmitting method 436 included in the process procedure 314 received at step 7201 and by use of the communication library 24 (at step 7213). Then, the program goes back to step 7201.

If the next participant is not present, the end identifier and the progression table 51 are transmitted to the electronic transaction server 11 through the communication network 15 (at step 7214). Then, the program goes back to step 7201.

Thus, according to this embodiment, the electronic transaction procedure which each client 12, 13, 14 needs for making an electronic deal is not distributed to the clients at a time, but only the process procedure necessary for the participant at the current stage is distributed to the client as the next participant according to the electronic transaction procedure, from the upstream-side client. Therefore, procedure information more than required can be prevented from being perceived by each client. Here, it should be noted that the transmission of the process procedure to be executed by the next participant from the server 11 to a data source participant that previously transmitted data also implies a kind of an acknowledge signal in response to the transmission of completion of the process procedure sent from the data source participant to the server 11.

There is an advantage that the amount of communication data in the third embodiment is less than in the second embodiment.

In this case, it can be considered that instead of transmitting the process procedure the downstream-side client needs from the upstream-side client to the downstream-side client, the downstream-side client itself requests the electronic transaction server to send the process procedure necessary for the client itself at the time of starting its own process procedure.

FIGS. 28 to 31 are flow charts for the operations in the fourth embodiment of the invention, in which the downstream-side client itself requests the server 11 to send the process procedure necessary for the client itself at the time of starting its own process procedure.

Figure 28:
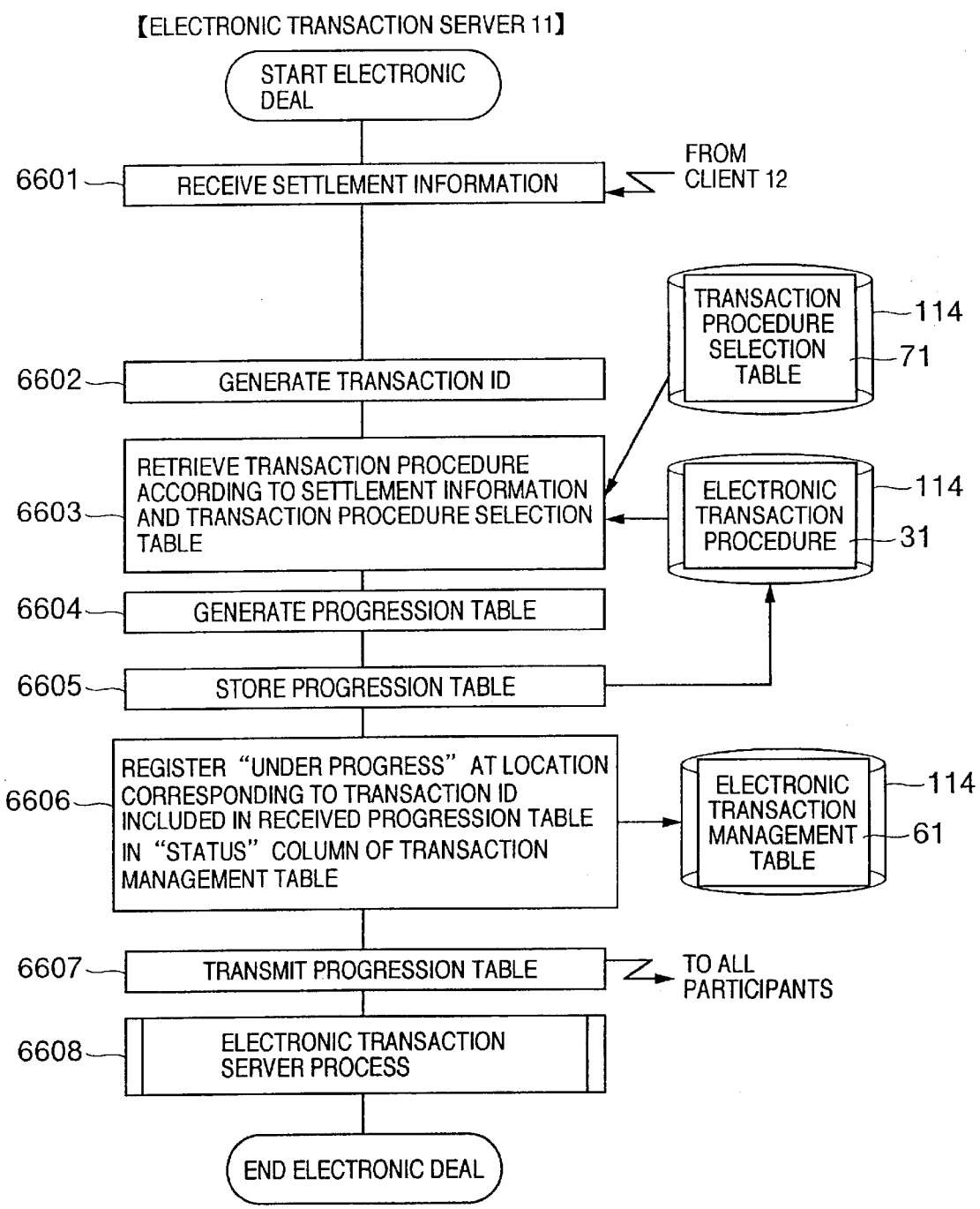
FIG. 28 is a flow chart for the electronic transaction server in the fourth embodiment of the invention.
Figure 29:
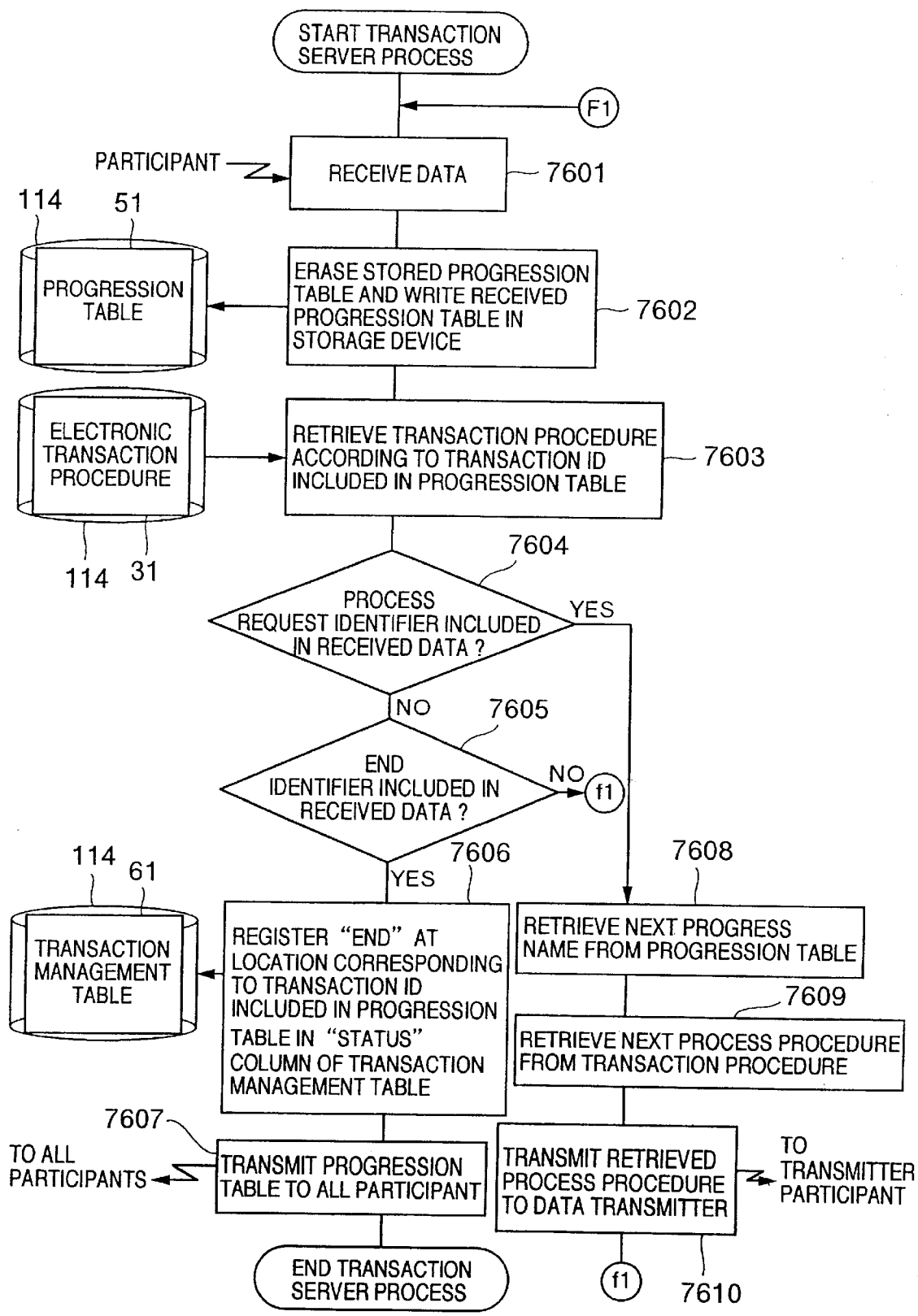
FIG. 29 is a flow chart for the details of the electronic transaction server process in FIG. 28.
Figure 30:
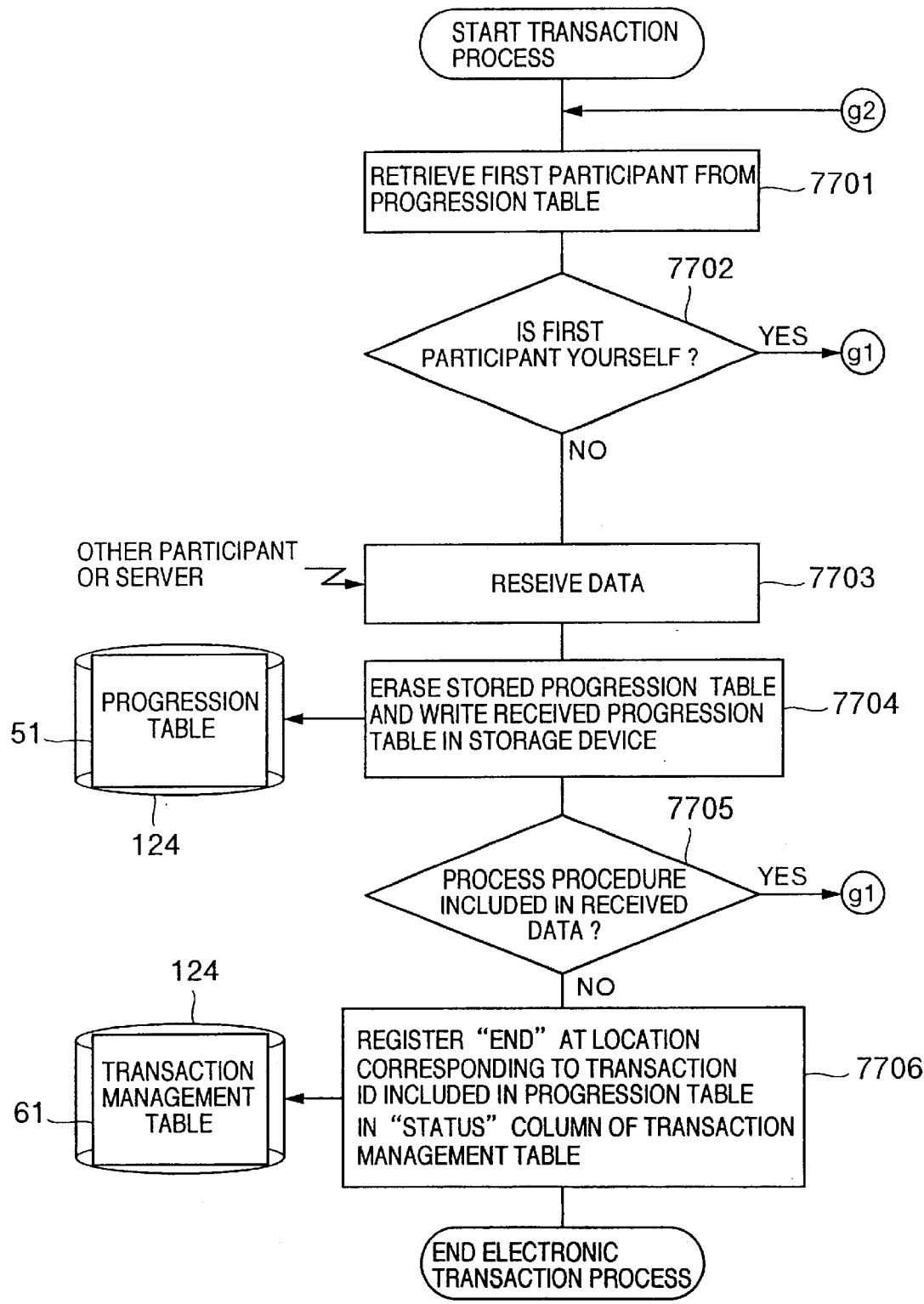
FIG. 30 is a flow chart for the details of the electronic transaction process in FIG. 28.
Figure 31:
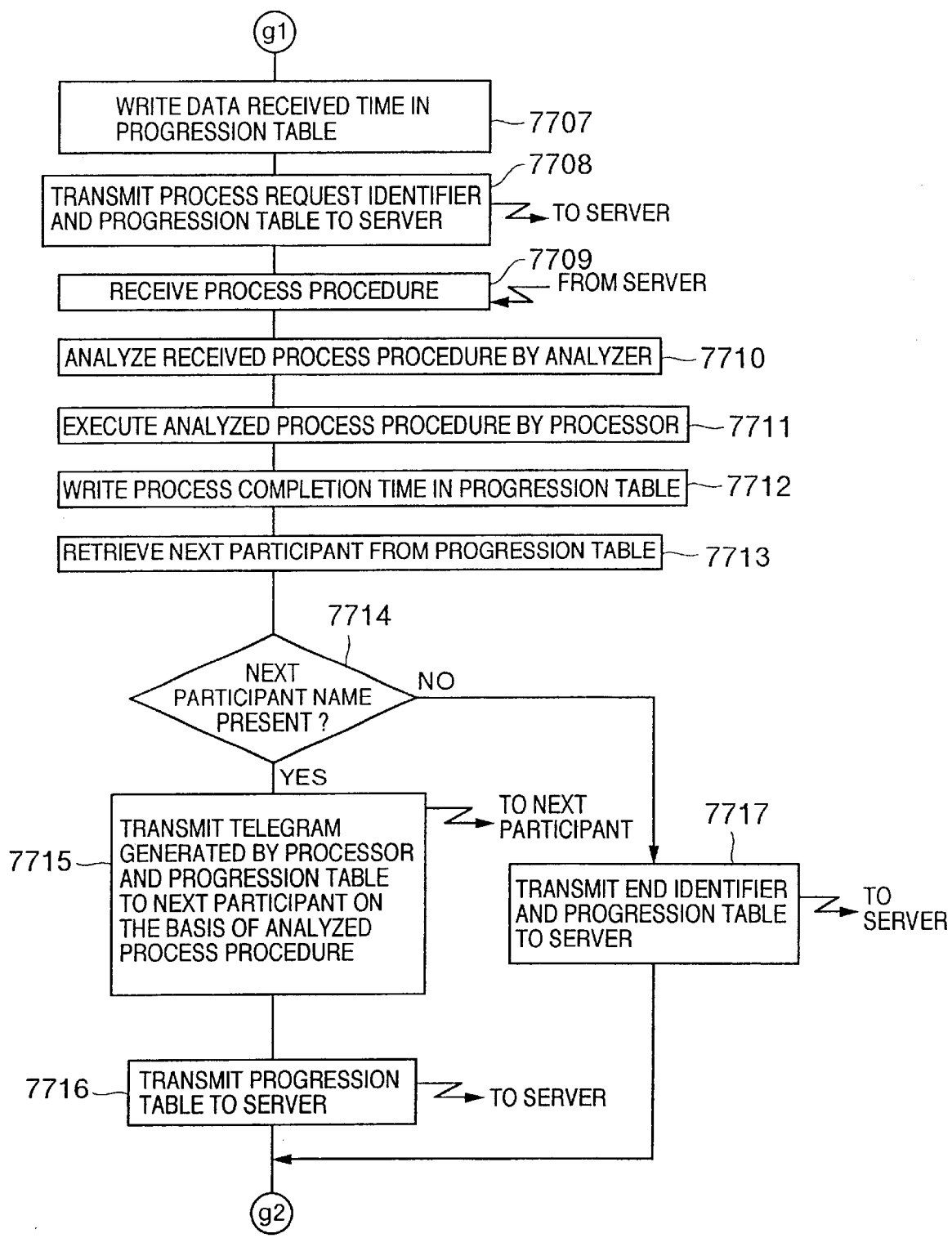
FIG. 31 is a flow chart continued from FIG. 30.

FIG. 28 is a flow chart of the electronic transaction server 11, FIG. 29 is a detailed flow chart of the electronic transaction server process in the server 11, and FIGS. 30 and 31 are detailed flow charts of the electronic transaction process in the client 12.

The whole process in the client 12 will be explained with reference to the flow chart of FIG. 18. In addition, it is assumed that the whole construction of the electronic transaction system including the apparatus and units for realizing this embodiment is as shown in FIG. 2, and that the module structure of each client 12, 13, 14 is as shown in FIG. 3.

The electronic transaction procedure will be mentioned with reference to FIGS. 10 to 14, the progression table to FIG. 15, the electronic transaction management table to FIG. 16, and the electronic transaction procedure selection table to FIG. 17.

The operation of this embodiment will be described with reference to the flow charts of FIGS. 28 to 31. The offer/retrieval/decision of information about the goods to be treated in a deal is assumed to be already finished. Also, the electronic deal is started from the electronic transaction client 12.

First, all the process of the electronic transaction server 11 will be described with reference to FIG. 28.

Step 6601

The electronic transaction server 11 receives settlement information from the electronic transaction client 12 through the communication network 15.

Step 6602

The electronic transaction server 11 generates the electronic transaction ID.

Step 6603

The electronic transaction server 11 retrieves the electronic transaction procedure 31 corresponding to the settlement information from the storage device 114 on the basis of the settlement information received from the electronic transaction client 12 and the electronic transaction procedure selection table 71.

Step 6604

The electronic transaction server 11 generates the progression table 51 as shown in FIG. 15 on the basis of the order table 312 included in the retrieved electronic transaction procedure 31.

Step 6605

The electronic transaction server 11 controls the storage device 114 to store the generated progression table 51.

Step 6606

The electronic transaction server 11 writes "UNDER PROCESS" at the location of the electronic transaction ID corresponding to the electronic transaction ID generated at step 6602 in the status column 613 of its own electronic transaction management table 61.

Step 6607

The electronic transaction server 11 transmits the progression table 51 through the communication network 15 to the participants (here, the electronic transaction clients 12, 13, 14) included in the participants table 311 of the electronic transaction procedure 31 retrieved at step 6603.

Step 6608

The electronic transaction server 11 executes the electronic transaction server process shown in FIG. 29.

Electronic Transaction Server Process

The electronic transaction server process will be described with reference to FIG. 29.

The electronic transaction server 11 receives data from a participant (at step 7601), and stores the progression table 51 included in the received data in the storage device 114 in place of the previous progression table (at step 7602).

The server retrieves the electronic transaction procedure 31 corresponding to the electronic transaction procedure ID 512 from the storage device 114 on the basis of the electronic transaction procedure ID 512 included in the received progression table 51 (at step 7603).

Then, decision is made of whether the process request identifier is included in the received data (at step 7604). If it is included, the program goes to step 7605, and if it is not included, the program goes to step 7608. In addition, decision is made of whether the end identifier is included in the received data (at step 7605). If it is included, the program goes to step 7606, and if it is not included, the program goes to step 7601 (at step 7605).

If the end identifier is included in the received data, the change from "UNDER PROCESS" to "END" is made at the location of the electronic transaction ID corresponding to the electronic transaction ID 511 included in the received progression table 51, in the status column 613 of its own electronic transaction management table 61 (at step 7606).

The progression table 51 is transmitted to all the participants included in the participants table 311 of the electronic transaction procedure 31 retrieved at step 7603, and this electronic deal ends (at step 7607).

If the process request identifier is included in the received data, the next process name 515 (the name of the process to be executed this time at the participant from which data was transmitted at step 7601) is retrieved from the progression table 51 (at step 7608).

Then, the process procedure 314 corresponding to the retrieved process name 515 is retrieved from the electronic transaction procedure 31 (at step 7609).

The retrieved process procedure 314 is transmitted to the participant from which data was transmitted at step 7601 (at step 7610), and thereafter the program goes back to step 7601 where data is received.

Electronic Transaction Process

The electronic transaction process will be described in detail with reference to FIGS. 30 and 31. Since the operations of the electronic transaction clients 12, 13 and 14 are the same, the operation of the client 12 will be described here as a typical example.

The electronic transaction client 12 retrieves the participant name 514 who first makes a process from the progression table 51 received from the server 11 (at step 7701).

If the participant who first makes a process is the participant concerned, or yourself, the program goes to step 7707, and if it is not so, the program goes to step 7703 (at step 7702).

If the participant who first makes a process is not yourself, data is received from another participant or server 11 (at step 7703).

Then, the progression table 51 included in the received data is written in the storage device 124 in place of the previous progression table (at step 7704).

If the process procedure 314 is included in the received data, which means that the preceding participant already finished the process procedure, the program goes to step 7707, and if it is not so, which means that this electronic deal was finished, or that it is the progression table from the server 11, the program goes to step 7706 (at step 7705).

If the process procedure 314 is not included in the received data, the change from "UNDER PROCESS" to "END" is made at the location of the electronic transaction ID corresponding to the electronic transaction ID 511 included in this received progression table 51, in the status column 613 of its own electronic transaction management table 61 (at step 7706), and the electronic transaction process ends.

If the process procedure 314 is included in the received data, the arrival time 516 of the received data is written in the progression table 51 (at step 7707).

Then, the process request identifier and progression table 51 are transmitted to the electronic transaction server 11 through the communication network 15 (step 7708).

The process procedure 314 to be next executed by yourself is received from the server 11 through the communication network 15 (at step 7709).

The received process procedure 314 is analyzed by the analyzer 21 (at step 7710). The processor 22 executes the analyzed process procedure 314 by use of the process library 23 and generates a message according to the message generating method 434 of the process procedure 314 (at step 7711).

The process completion time 517 is written in the progression table 51 (at step 7712). Then, the next participant name 514 is retrieved from the progression table 51 (step 7713).

If the next participant is present, the program goes to step 7715, and if it is not so, the program goes to step 7717 (at step 7714).

If the next participant is present, the processor 22 transmits the message produced at the processor 22 and the progression table 51 through the communication network 15 to the next participant, or client on the basis of the message transmitting method 436 included in the process procedure 314 and by use of the communication library 24 (at step 7715). In addition, the progression table 51 is transmitted through the communication network 15 to the electronic transaction server 11 (at step 7716), and the program goes back to step 7701.

If the next participant is not present, the end identifier and the progress table 51 are transmitted through the communication network 15 to the electronic transaction server 11 (at step 7717), and the program goes back to step 7701.

Thus, instead of the fact that the precess procedure the downstream-side client needs is transmitted from the upstream-side client to the downstream-side client, the downstream-side client itself requests the server 11 to send its own necessary process procedure. Therefore, like the third embodiment, procedure information more than required can be prevented from being perceived.

In addition, the amount of communication data is less than in the second embodiment.

In the third embodiment, since the upstream-side client requests the server 11 to send the necessary process procedure and distributes it to the downstream-side client, there is a possibility that the information of process procedure is known by the upstream client. Contrarily, in the fourth embodiment, since the participant concerned, or yourself requests the server 11 to send the necessary process procedure, our own process procedure can be protected from the reveal to other participants.

Moreover, in this embodiment, if the name of the server 11 is written in the progression table 51 as the final participant name, the server 11 can recognize the end of the electronic deal from the progression table 51, and thus the end identifier can be omitted.

While in all the embodiments given above the electronic transaction server 11 is provided as an independent unit, any one of the electronic transaction clients 12, 13 and 14 may function as both the server and itself instead of that independent server.

Thus, according to the embodiments of the invention, before starting an electronic deal, the buyer, electronic transaction client inputs information of settlement means, amount of deal and the contents and property of goods, and transmits it as electronic transaction procedure selection information to the electronic transaction server. The sever retrieves the electronic transaction procedure corresponding to the electronic transaction procedure selection information from the storage device, and distributes it to the client associated with this electronic deal. Therefore, since any electronic deal is executed according to the electronic transaction procedure received by each client, there is no need to previously hold the electronic transaction procedure corresponding to various kinds of settlement means or the like in each client, with the result that the electronic deal can be flexibly performed.

In addition, even though the electronic transaction procedure is required to change for the reasons to improve the service to the buyer, only the electronic transaction procedures stored in the storage device of the server are changed to cope with it, and thus the change of the electronic transaction procedure can be made swiftly and simply.

Moreover, since each client needs to have incorporated therein only a communication processing function which is capable of receiving the electronic transaction procedure distributed from the server, the capacity of the storage device can be reduced.

Also, since the progression table is generated at each deal and used to manage the situations of the process in each client, the progressive situations of dealings can be managed independently even though the electronic transaction procedure is altered, and the electronic transaction procedure itself can be prevented from being complicated. Thus, the burden on the generation operations can be reduced.

In addition, since the electronic transaction procedure is not distributed to all the participants at a time, but distributed together with a message, each client does not need to manage the electronic transaction procedure, and thus the electronic transaction procedure can be prevented from being altered or falsified at each client.

Furthermore, since only the process procedure required by the next participant at the present stage is sent from the upstream-side client or the downstream-side client itself requests the server to send its own necessary process procedure, instead of the fact that the electronic transaction procedure required for an electronic deal by each client is distributed to the clients at a time, procedure information more than necessary can be prevented from being revealed to each client, and there is the effect that the amount of communication data can be reduced.

What is claimed is:

1. A server computer for conducting an electronic deal with client terminals via a communication network, comprising:

receiving means for receiving first information as to a settlement method, desired by a purchaser, from a purchaser side client terminal on a purchaser side of said electronic deal;

a storage device for storing second information to be used for a process to be executed by said purchaser side client terminal, said second information being stored for each of a plurality of settlement methods for said electronic deal;

retrieving means for retrieving, from said storage device, second information corresponding to the first information thus received; and transmitting means for transmitting the second information thus retrieved to said purchaserside client terminal.

2. The server computer according to claim 1, wherein said second information is information to be used as part of a series of processes which are necessary for completing said electronic deal.

3. The server computer according to claim 2, wherein the information to be used for the part of the processes is information for a settlement process to be executed by said purchaser side client terminal.

4. The server computer according to claim 1, wherein said plurality of settlement methods include a settlement by credit and a settlement by direct payment to a bank.

5. The server computer according to claim 1, wherein said receiving means receives said first information from said purchaser side client terminal prior to start of said electronic deal, wherein said retrieving means retrieves, from said storage means, said second information corresponding to the first information thus received prior to start of said electronic deal, and wherein said transmitting means transmits the second information thus retrieved to said purchaser side client terminal prior to the start of said electronic mail.

6. The server computer according to claim 1, further comprising:

updating means for updating second information stored in said storage device, and wherein said transmitting means transmits the second information thus updated to said purchaser side client terminal.

7. A method for conducting an electronic deal with client terminals via a communication network, comprising the steps of:

receiving first information as to a settlement method, desired by a purchaser, from a purchaser side client terminal on a purchaser side of said electronic deal;

retrieving second information corresponding to the first information thus received from a storage device for storing second information to be used for a process to be executed by said purchaser side client terminal, said second information being stored for each of a plurality of settlement methods for said electronic deal; and transmitting the second information thus retrieved to said purchaser side client terminal.

8. The method according to claim 7, wherein said second information is information to be used for a part of a series of processes which are necessary for completing said electronic deal.

9. The method according to claim 8, wherein the information to be used for the part of the processes is information for a settlement process to be executed by said purchaser side client terminal.

10. The method according to claim 7, wherein said plurality of settlement methods include a settlement by credit and a settlement by direct payment to a bank.

11. The method according to claim 7, wherein in said receiving step, said first information is received from said purchaser side client terminal prior to start of said electronic deal, wherein in said retrieving step, said second information corresponding to the first information thus received is retrieved from said storage device prior to start of said electronic deal, and wherein in said transmitting step, the second information thus retrieved is transmitted to the said purchaser side client terminal prior to the start of said electronic deal.

12. The method according to claim 7, further comprising the step of:

updating second information stored in said storage device, wherein in said transmitting step, the second information thus updated is transmitted to said purchaser side client terminal.

* * * * *